United States Patent
Miklós

(10) Patent No.: US 11,375,415 B2
(45) Date of Patent: Jun. 28, 2022

(54) METHODS PROVIDING ANCHOR CHANGE FOR ETHERNET PDU SESSIONS AND RELATED NETWORK ENTITIES/NODES

(71) Applicant: Telefonaktiebolaget LM Ericsson (publ), Stockholm (SE)

(72) Inventor: György Miklós, Pilisborosjenö (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 408 days.

(21) Appl. No.: 16/476,386

(22) PCT Filed: Jan. 18, 2019

(86) PCT No.: PCT/IB2019/050444
§ 371 (c)(1),
(2) Date: Jul. 8, 2019

(87) PCT Pub. No.: WO2019/243901
PCT Pub. Date: Dec. 26, 2019

(65) Prior Publication Data
US 2021/0345193 A1    Nov. 4, 2021

Related U.S. Application Data

(60) Provisional application No. 62/686,898, filed on Jun. 19, 2018.

(51) Int. Cl.
*H04W 72/04* (2009.01)
*H04W 36/00* (2009.01)
*H04W 36/12* (2009.01)

(52) U.S. Cl.
CPC ... *H04W 36/0069* (2018.08); *H04W 36/0033* (2013.01); *H04W 36/12* (2013.01)

(58) Field of Classification Search
None
See application file for complete search history.

(56) References Cited

U.S. PATENT DOCUMENTS

2018/0199243 A1* 7/2018 Bharatia ........... H04W 36/0027

OTHER PUBLICATIONS

Written Opinion of the International Preliminary Examining Authority, PCT/IB2019/050444, dated May 12, 2020, 18 pages.
International Search Report and Written Opinion of the International Searching Authority, PCT/IB2019/050444, dated Apr. 1, 2019, 19 pages.

(Continued)

*Primary Examiner* — Sai Aung
(74) *Attorney, Agent, or Firm* — Sage Patent Group

(57) ABSTRACT

A method of operating a session management function SMF entity of a wireless communication network may be provided. An Ethernet context for a wireless terminal may be received from a first user plane function UPF entity, wherein the Ethernet context is provided for an Ethernet Protocol Data Unit PDU Session for the wireless terminal using the first UPF entity, and wherein the Ethernet context includes a Medium Access Control MAC address for the wireless terminal. The Ethernet context including the MAC address for the wireless terminal may be transmitted to a second UPF entity. Related methods of operating user plane function UPF entities of a wireless communication network may also be provided.

21 Claims, 16 Drawing Sheets

(56) References Cited

OTHER PUBLICATIONS

3GPP TR 23.725 V0.2.0 (Jun. 2018), 3rd Generation Partnership Project; Technical Specification Group Services and System Aspects; Study on enhancement of URLLC supporting in 5GC (Release 16), Jun. 11, 2018, XP051451684, 28 Pages.

3GPP TR 23.725 V0.4.0 (Aug. 2018), 3rd Generation Partnership Project; Technical Specification Group Services and System Aspects; Study on enhancement of Ultra-Reliable Low-Latency Communication (URLLC) support in the 5G Core network (5GC) (Release 16), Sep. 6, 2018, XP051546258, 59 Pages.

3GPP TS 23.501 V15.2.0 (Jun. 2018), 3rd Generation Partnership Project; Technical Specification Group Services and System Aspects; System Architecture for the 5G System; Stage 2 (Release 15), Jun. 18, 2018, XP051535223, 217 Pages.

Ericsson, "Anchor change for Ethernet PDU Sessions", 3GPP TSG-SA WG2 Meeting #128, Vilnius, Lithuania Jul. 2-6, 2018, S2-186420, XP051537910, 4 Pages.

\* cited by examiner

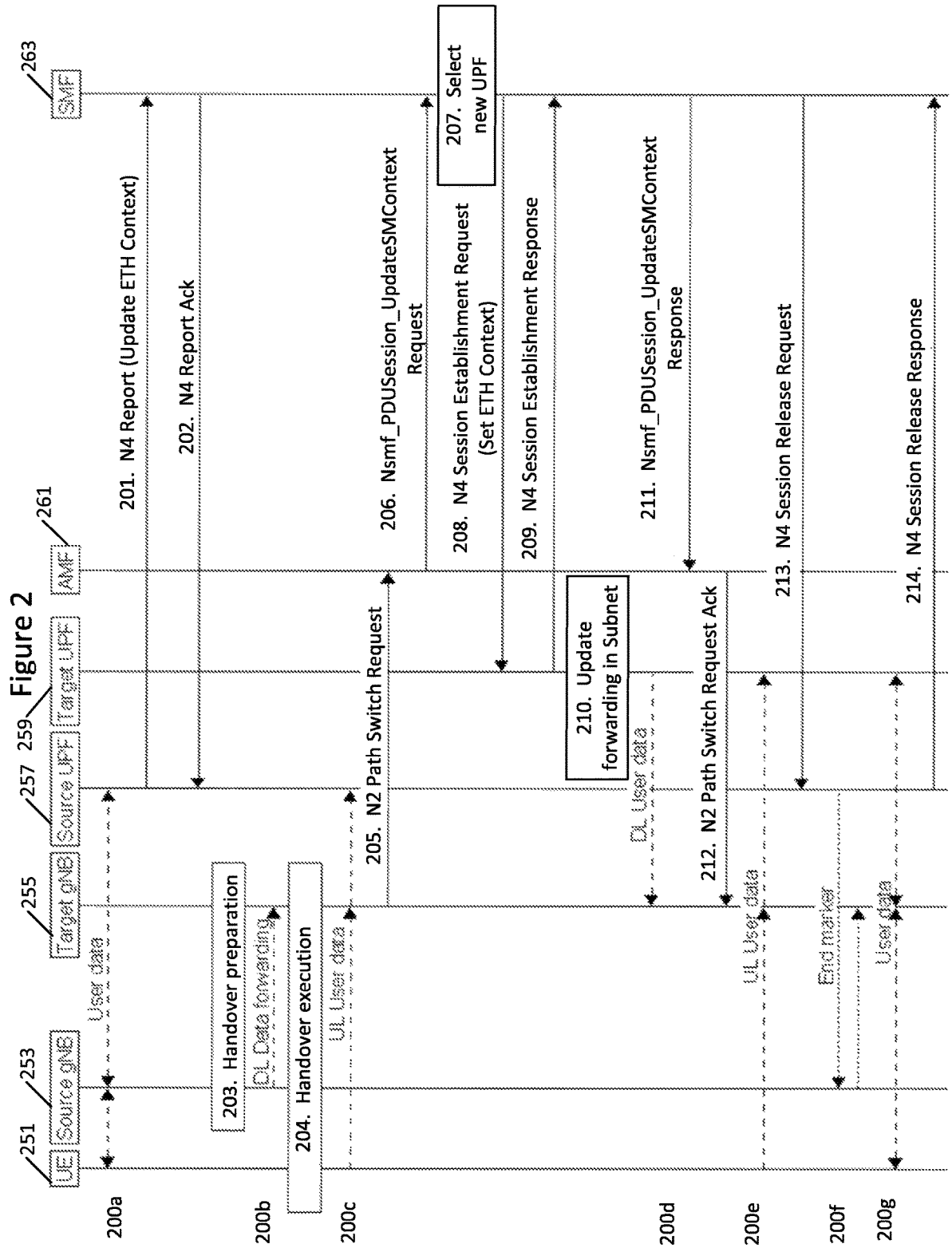

US 11,375,415 B2

METHODS PROVIDING ANCHOR CHANGE FOR ETHERNET PDU SESSIONS AND RELATED NETWORK ENTITIES/NODES

This application is a 35 U.S.C. § 371 national stage application of PCT International Application No. PCT/IB2019/050444 filed on Jan. 18, 2019, which in turns claims domestic priority to U.S. Provisional Patent Application No. 62/686898, filed on Jun. 19, 2018, the disclosures and content of which are incorporated by reference herein in their entirety.

TECHNICAL FIELD

The present disclosure relates generally to communications, and more particularly to wireless communications and related communication entities and/or nodes.

BACKGROUND

The 5G system has defined a number of Session and Service Continuity (SSC) modes for wireless terminals (UEs) that move. These modes may facilitate the use of a PDU Session Anchor (PSA) that is close to the UE's current point of attachment to the network in RAN. SSC modes 1, 2 and 3 are defined in 3GPP TS 23.501 section 5.6.9. The currently defined SSC modes are as follows.

SSC mode 1 applies an unchanged PSA even when the UE moves. This may reduce/avoid issues and/or complexities associated with the change of the PSA, but a distance between the PSA and the UE may increase, which may increase an end to end latency and may also increase network traffic in the operator's network.

SSC mode 2 applies a break before make principle in setting up a new PDU Session: as the UE moves further away from its original PSA, the old PDU Session is released, and the UE is instructed to establish a new PDU Session for which a PSA is selected close to the UE's new location.

SSC mode 3 applies a make before break principle in setting up a new PDU Session: as the UE moves further away from its original PSA, the UE is instructed to establish a new PDU session for which a PSA is selected close to the UE's new location. The UE may prefer the use of the new PDU session for its network traffic. The old session co-exists with the new session for a temporary period of time. After some time, the old session is released.

SSC modes 2 and 3 may apply to only PDU Session types IPv4/v6, while SSC mode 1 can apply to any type of PDU Session. The reason is that SSC modes 2 and 3 may imply that the UE will get a new IP address assigned for its new PDU session. A new IP address may be necessary, because the IP address may carry topological significance at the data network, hence a PSA at a new location may require an IP address in the case of IP routing. Existing solutions may not adequately address mobility issues relating to Ethernet PDU sessions.

SUMMARY

According to some embodiments of inventive concepts, a method of operating a session management function SMF entity of a wireless communication network may be provided. An Ethernet context for a wireless terminal may be received from a first user plane function UPF entity, wherein the Ethernet context is provided for an Ethernet Protocol Data Unit PDU Session for the wireless terminal using the first UPF entity, and wherein the Ethernet context includes a Medium Access Control MAC address for the wireless terminal. The Ethernet context including the MAC address for the wireless terminal may be transmitted to a second UPF entity.

According to some embodiments of inventive concepts, complexity in handling Ethernet PDU sessions may be reduced in both the network and in the user equipment, and a need for PDU session release and re-establishment may be reduced/avoided. Moreover, shorter delays may be provided by using a nearby PSA without impacting operations of user equipment.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 2 provides a signaling diagram illustrating network operations of handover of a PDU session from a source gNB and a source UPF to a target gNB and a target UPF;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 5:
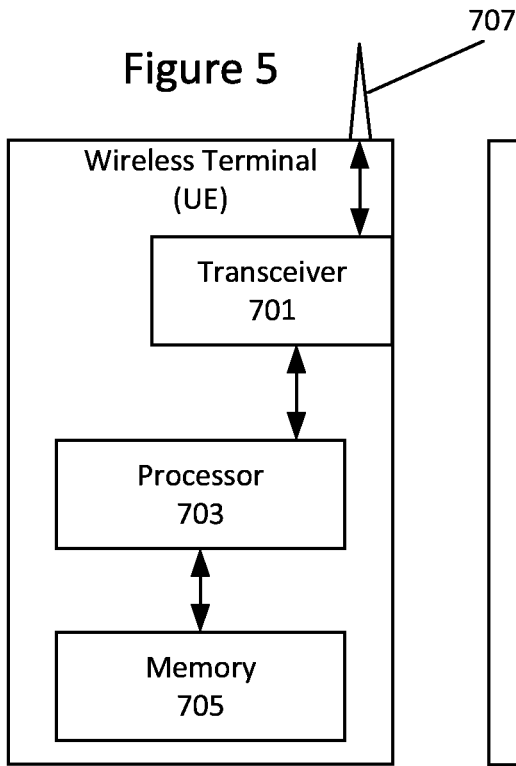
FIG. 5 is a block diagram illustrating a wireless terminal according to some embodiments of inventive concepts.

FIG. 5 is a block diagram illustrating elements of a mobile terminal UE (also referred to as a wireless device, a wireless communication device, a wireless terminal, a wireless communication terminal, user equipment, a user equipment node/terminal/device, etc.) configured to provide wireless communication according to embodiments of inventive concepts. As shown, mobile terminal UE may include an antenna 707, and a transceiver circuit 701 (also referred to as a transceiver) including a transmitter and a receiver configured to provide uplink and downlink radio communications with a base station(s) of a radio access network. Mobile terminal UE may also include a processor circuit 703 (also referred to as a processor) coupled to the transceiver circuit, and a memory circuit 705 (also referred to as memory) coupled to the processor circuit. The memory circuit 705 may include computer readable program code that when executed by the processor circuit 703 causes the processor circuit to perform operations according to embodiments disclosed herein. According to other embodiments, processor circuit 703 may be defined to include memory so that a separate memory circuit is not required. Mobile terminal UE may also include an interface (such as a user interface) coupled with processor 703, and/or mobile terminal UE may be incorporated in a vehicle.

As discussed herein, operations of mobile terminal UE may be performed by processor 703 and/or transceiver 701. For example, processor 703 may control transceiver 701 to transmit communications through transceiver 701 over a radio interface to another UE and/or to receive communications through transceiver 701 from another UE over a radio interface. Moreover, modules may be stored in memory 705, and these modules may provide instructions so that when instructions of a module are executed by processor 703, processor 703 performs respective operations (e.g., operations discussed below with respect to Example Embodiments).

Figure 6:
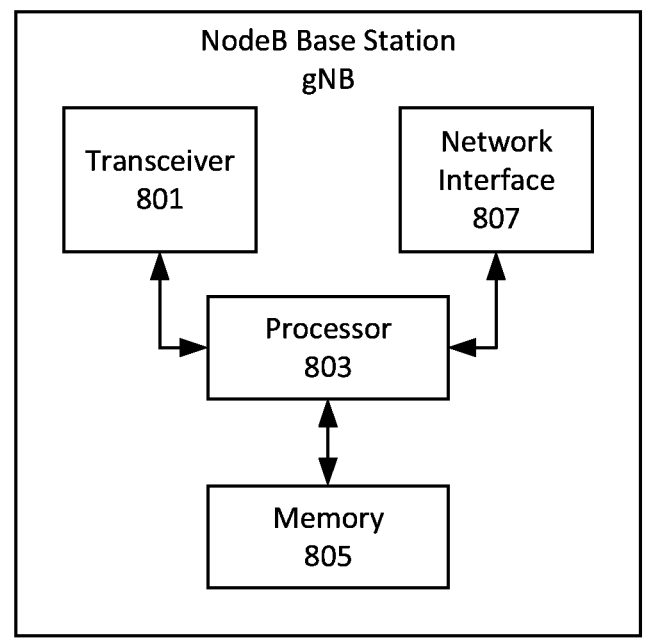
FIG. 6 is a block diagram illustrating a NodeB RAN base station (gNB) according to some embodiments of inventive concepts.

FIG. 6 is a block diagram illustrating elements of a NodeB base station (also referred to as a network node, base station, eNodeB, eNB, gNodeB, gNB, etc.) of a Radio Access Network (RAN) configured to provide cellular communication according to embodiments of inventive concepts. As shown, the NodeB base station may include a transceiver circuit 801 (also referred to as a transceiver) including a transmitter and a receiver configured to provide uplink and downlink radio communications with mobile terminals. The NodeB base station may include a network interface circuit 807 (also referred to as a network interface) configured to provide communications with other nodes (e.g., with other base stations and/or other entities) of the RAN. The NodeB base station may also include a processor circuit 803 (also referred to as a processor) coupled to the transceiver circuit, and a memory circuit 805 (also referred to as memory) coupled to the processor circuit. The memory circuit 805 may include computer readable program code that when executed by the processor circuit 803 causes the processor circuit to perform operations according to embodiments disclosed herein. According to other embodiments, processor circuit 803 may be defined to include memory so that a separate memory circuit is not required.

As discussed herein, operations of the NodeB base station may be performed by processor 803, network interface 807, and/or transceiver 801. For example, processor 803 may control transceiver 801 to transmit communications through transceiver 801 over a radio interface to one or more mobile terminals UEs and/or to receive communications through transceiver 801 from one or more mobile terminals UEs over a radio interface. Similarly, processor 803 may control network interface 807 to transmit communications through network interface 807 to one or more other network nodes/entities and/or to receive communications through network interface from one or more other network nodes/entities. Moreover, modules may be stored in memory 805, and these modules may provide instructions so that when instructions of a module are executed by processor 803, processor 803 performs respective operations.

According to some other embodiments, elements of a NodeB base station may be implemented as a control node without a transceiver. In such embodiments, transmission to a mobile terminal may be initiated by the control node so that transmission to the wireless terminal is provided through a network node including a transceiver, e.g., through a base station. According to embodiments where the control node is a base station including a transceiver, initiating transmission may include transmitting through the transceiver.

Figure 7:
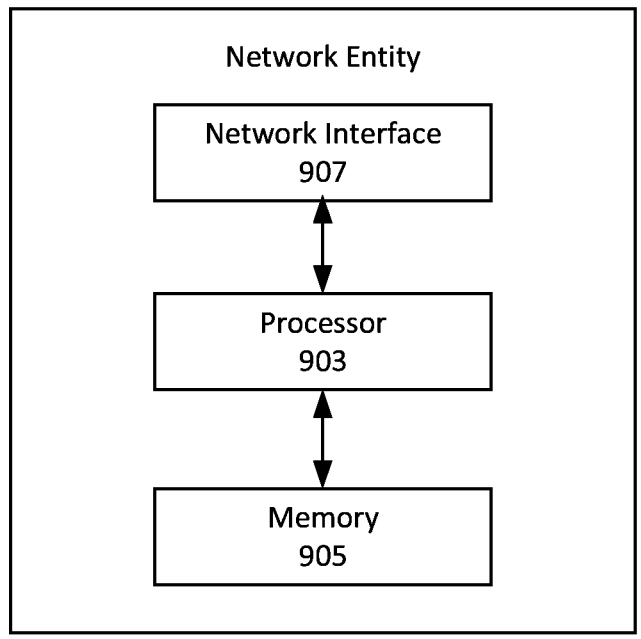
FIG. 7 is a block diagram illustrating a network entity according to some embodiments of inventive concepts.

FIG. 7 is a block diagram illustrating elements of a network entity (e.g., a UPF entity, an AMF entity, an SMF entity, or any other control entity of the radio access network RAN or core network CN) configured to support cellular communication according to embodiments of inventive concepts. Such network entities may also be referred to as network nodes. As shown, the network entity may include a network interface circuit 907 (also referred to as a network interface) configured to provide communications with other network entities/nodes (e.g., with a base station and/or with another network entity of the RAN and/or CN). The network entity may also include a processor circuit 903 (also referred to as a processor) coupled to the network interface circuit 907, and a memory circuit 905 (also referred to as memory) coupled to the processor circuit. The memory circuit 905 may include computer readable program code that when executed by the processor circuit 903 causes the processor circuit to perform operations according to embodiments disclosed herein. According to other embodiments, processor circuit 903 may be defined to include memory so that a separate memory circuit is not required.

As discussed herein, operations of the network entity may be performed by processor 903 and/or network interface 907. For example, processor 903 may control network interface 907 to transmit communications through network interface 907 to one or more other network nodes/entities and/or to receive communications through network interface from one or more other network nodes/entities. Moreover, modules may be stored in memory 905, and these modules may provide instructions so that when instructions of a module are executed by processor 903, processor 903 performs respective operations. As noted above, the structure of the network entity of FIG. 7 may be used, for example, to implement a UPF entity, an AMF entity, and/or an SMF entity to perform operations thereof as discussed in greater detail below. Operations of a network entity of FIG. 7, for example, may be performed by one network server or distributed across a plurality of network servers having the structure of FIG. 7, and a plurality of such distributed servers may be collectively referred to as a server.

Even though SSC modes 2 and 3 may facilitate the use of a close PSA, these modes may have limitations. They may only apply to PDU Sessions of type IPv4/v6, and may not apply to Ethernet PDU Sessions even though Ethernet PDU Sessions may also benefit from a nearby PSA. SSC mode 2 may disrupt the data traffic due to the session release and re-establishment. SSC mode 3 may reduce/avoid the disruption in principle, but implementing SSC mode 3 may require UE support, which may involve complexity that may not always be reasonable. According to some embodiments of inventive concepts, an SSC mode may be provided for Ethernet PDU Sessions, and/or SSC mode 1 may be adjusted specifically for Ethernet PDU Sessions. In the case of Ethernet PDU Sessions, the PSA may be moved even without releasing the session. Such embodiments may change the PSA of the ongoing session, in combination with updating the forwarding in the data network.

Thereby, simplified handling in both the network and in the terminal may be possible, particularly, as there may be no need for PDU Session release and re-establishment. This also means that the process may be faster. The mechanism may not impact the UE, other than the UE can enjoy the benefits of possibly shorter delay due to the nearby PSA.

A consequence of this approach may be that it becomes easier to support deployments where the PSA is co-located with the RAN node (i.e., they are at the same site or even running on the same platform). This may simplify deployments, for example, in small local industrial deployments.

Figure 1:
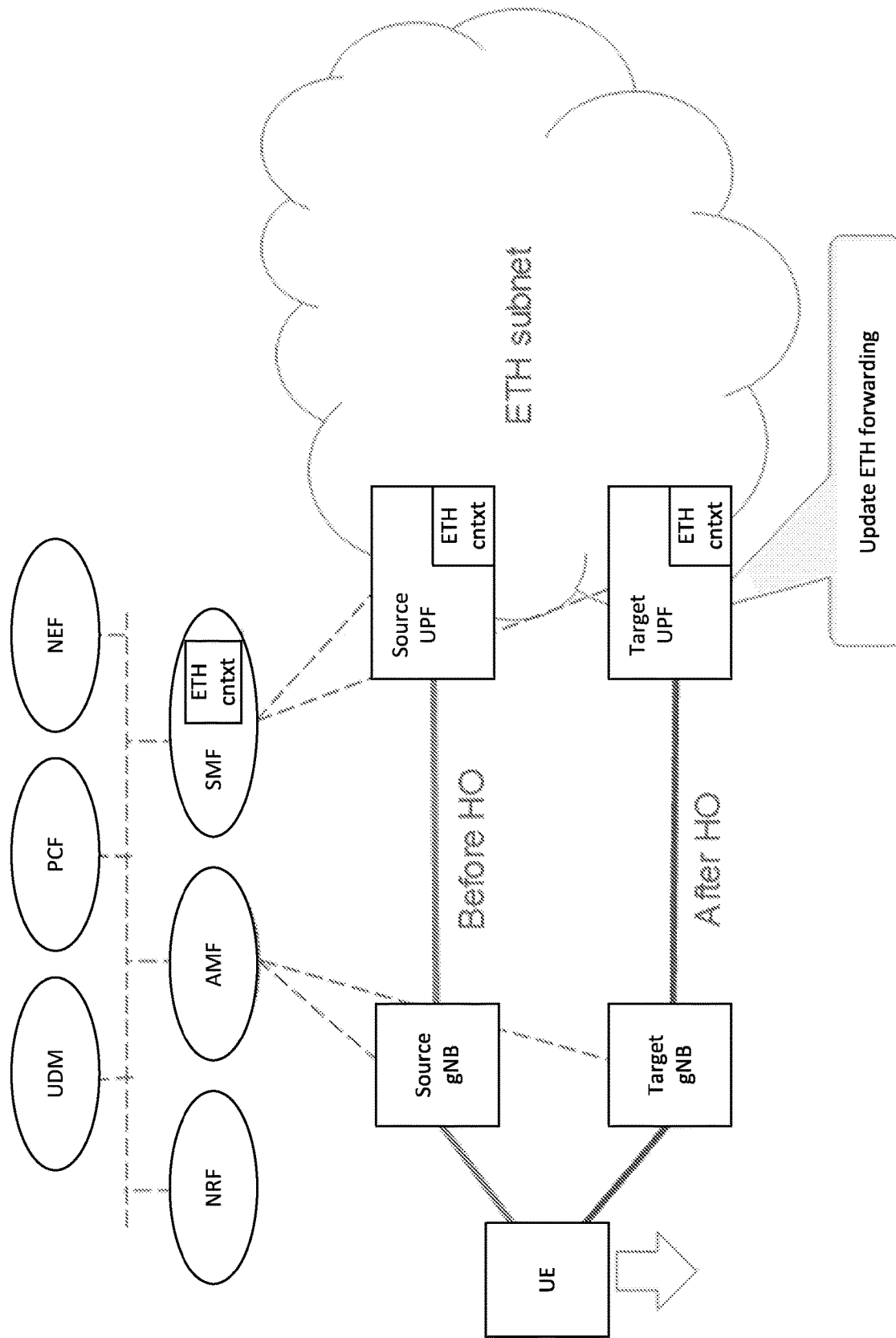
FIG. 1 is a diagram illustrating movement of a UE from a source gNB to a target gNB according to some embodiments of inventive concepts.

Some embodiments of inventive concepts are illustrated in the diagram of FIG. 1. Embodiments of FIG. 1 may be applied in a 5G system, but the same/similar embodiments may be equally applied, with appropriate adjustments, in a 4G system, a 3G system, a 2G system, and/or other mobile/wireless communication systems.

In FIG. 1, wireless terminal UE is originally connected via RAN node Source gNB (also referred to as a source base station) and CN node Source UPF, acting as the PSA. The CN control plane entities AMF, SMF may assist in establishment of the session. FIG. 1 also shows the control plane entities UDM, NRF, PCF, NEF, even though they may not be essential to the discussion below. The 5G system connects to an Ethernet data network, shown as ETH subnet.

The source UPF may maintain an Ethernet context (ETH cntxt), which includes information related to the Ethernet network that it connects to. More particularly, the Ethernet context includes the MAC address used by the wireless terminal UE for Ethernet traffic. The Medium Access Control MAC address may be determined by the UPF, for example, by learning the Medium Access Control MAC address based on the ongoing traffic, or by explicit configuration. In some cases, there may be multiple MAC addresses corresponding to the PDU session, due the wireless terminal UE having multiple addresses, or due to other Ethernet devices connecting via the UE (in which case the Ethernet context may include multiple MAC addresses).

The Ethernet context is copied from the source UPF to the SMF. In the event that the Ethernet context for wireless device UE changes, the changes are updated in the SMF's copy as well. The Ethernet context may be stored at the SMF so that the SMF can provide the current Ethernet context to a new/target UPF when a new PSA is established.

In the event of wireless terminal UE mobility, wireless terminal UE moves to a target gNB (also referred to as a target base station). The CN, or more particularly the SMF, may decide to establish a new PSA. In the example of FIG. 1, the Target UPF that will act as the new PSA. The tunneling is updated, from the Source gNB—Source UPF tunnel before the handover to the Target gNB—Target UPF after the handover. The SMF installs the Ethernet context in the Target UPF. After that, the target UPF updates the forwarding in the Ethernet subnetwork. This may be done in several ways, depending on which mode of operation is used.

In case MAC learning is applied in the Ethernet subnetwork, the target UPF may generate an Ethernet frame with the MAC address stored in the Ethernet context, and the target UPF may send it as a flooded frame in the Ethernet subnetwork. Such a frame may be, for example, a broadcast frame. It might not be necessary to include data payload in such a frame, even though it may be possible to include data payload. Sending such a frame will update the Ethernet forwarding in the subnet. It may be possible to send multiple flooded frames to protect against drops or transient behaviors.

In the event that a central controller sets the Ethernet subnet's forwarding tables, the target UPF may contact the central controller to notify the central controller that the given MAC address is now reachable at the new location (target UPF).

In addition to the two approaches discussed above, additional approaches may also be possible.

a According to some embodiments, it may be possible to trigger the UE (e.g., by sending a signaling message to the UE) to send an Ethernet frame which updates forwarding in the subnet.

According to some embodiments, it may be possible to not immediately update the forwarding in the Ethernet subnet. In such cases, frames may be sent to the old PSA, which may forward downlink packets to the UE for a temporary period of time. New uplink frames via the new PSA can update the Ethernet forwarding.

According to some embodiments, it may be possible to not immediately update the forwarding in the Ethernet subnet. The old PSA (knowing that it no longer reaches the UE with the given MAC address) may flood downlink frames in the local subnet, so that they also reach the new PSA and eventually get forwarded to the UE. Eventually, and uplink frame from the UE can update the forwarding in the subnet.

In the event that the Ethernet context includes multiple MAC addresses, the operations discussed above may be repeated for all MAC addresses of the Ethernet context for the UE. According to some embodiments, it may be possible that the Ethernet handling functions are not integrated with the UPF, in which case the UPF may instruct the Ethernet handling functions to perform the necessary operations, using a signaling protocol.

The signaling diagram of FIG. 2 illustrates some embodiments of inventive concepts for an Xn based handover in a 5G system from the Source gNB 253 to the Target gNB 255. In FIG. 2, the Xn based handover may be updated.

Initially, the Ethernet PDU Session is established with the user data going via Source gNB 253 and Source UPF 257 (at 200a). The Source UPF 257 acts as the PSA.

201. The Source UPF 257 transmits an N4 Report to inform the SMF 263 about the Ethernet context (i.e., any information maintained related to the Ethernet network that the Source UPF 257 interfaces with). Specifically, the N4 Report may include a medium access control MAC address for the UE 251 that the Source UPF 257 has learned from the UE side. In case of any changes in the Ethernet context, the change is updated to the SMF 263 so that the SMF 263 maintains an up-to-date copy of the Ethernet context in the source UPF 253 for the UE 251. This signaling may be realized using the N4 reporting procedure.

202. The SMF 263 acknowledges the source UPF report of operation 201, for example, using an N4 Report Acknowledge (Ack) transmitted from the SMF 263 to the source UPF 257.

203. An Xn handover is prepared in RAN (including source and target gNBs 253 and 255), followed by downlink data forwarding from Source to Target gNB (at 200b).

204. Handover is executed in the radio access network RAN (including source and target gNBs 253 and 255), and the UE 251 connects to Target gNB 255. After that, uplink data can pass through via the Target gNB 255 and Source UPF 257 (at 200c).

205. Target gNB 255 initiates transmission of a Path Switch Request to the AMF 261 to perform the switching of the user plane in the CN.

206. The path switch is signaled from AMF 261 to SMF 263, for example, by transmitting a Nsmf_PDUSession_UpdateSMContext Request.

207. The SMF 263 decides that the PSA is to be changed for the Ethernet PDU Session, and selects the new UPF that will act as Target UPF 259.

208. The Target UPF N4 session is established, including the RAN node's tunnel endpoint to be used between the target gNB 255 and the target UPF 259. The Ethernet context is also sent from the SMF 263 to the Target UPF 259, for example, by transmitting an N4 Session Establishment Request.

209. The establishment of the new N4 session is acknowledged from the Target UPF 259 to the SMF 263, for example, by transmitting an N4 Session Establishment Response.

210. The Ethernet forwarding is updated in the Ethernet subnetwork. This can be performed by the Target UPF 259 generating a new Ethernet frame with the MAC address for UE 251 as the source in case the Ethernet network uses MAC learning, or by instructing a central controller of the Ethernet network that the given MAC address is reachable at the new location in the event that a central controller in the Ethernet network is used to set the forwarding tables of the Ethernet network. In case of multiple MAC addresses for UE 251, the process may be repeated for each MAC address. From this point on, downlink frames for the UE 251 may be forwarded towards the Target gNB 259 (at 200d). Further discussion/options to update Ethernet forwarding are discussed above.

211. Path switch may be acknowledged from the SMF 263 to the AMF 261 using an Nsmf_PDUSession_UpdateSMContextResponse. This signaling may also include the tunnel endpoint at the target UPF 259 for the target gNB 255 to target UPF 259 tunnel. If no end marker will be provided for target gNB 255, the Nsmf_PDUSession_UpdateSMContextResponse of operation 211 may include a no end marker flag indicating that there will be no end marker for the Ethernet PDU session.

212. Path switch may be acknowledged from the AMF 261 to the Target gNB 255 using an N2 Path Switch Request Ack. This signaling also includes the tunnel endpoint at the target UPF 259 for the target gNB 255 to target UPF 259 tunnel. From this point on, uplink frames from the UE 251 can pass via the Target gNB 255 and the Target UPF 259 (at 200e). Responsive to the Nsmf_PDUSession_UpdateSMContextResponse of operation 211 including a no end marker flag as discussed above with respect to operation 211, the N2 Path Switch Request Ack may include a no end marker flag indicating that there will be no end marker for the Ethernet PDU session. Accordingly, the target gNB will know that there will be no end marker based on receiving the no end marker flag.

213. The N4 session is released at the Source UPF 257, for example, using an N4 Session release request. This triggers the Source UPF 257 to send an end marker via the Source gNB 253 to the Target gNB 255 (at 200f), helping the Target gNB 255 deliver frames in order. After this, the Target gNB 255 knows that it does not need to expect further frames from the Source gNB 253. The user plane is now switched and user data is now communicated via Target gNB 255 and Target UPF 259 in both uplink and downlink (at 200g).

214. The N4 session release is acknowledged from the source UPF 257 to the SMF 263 using an N4 Session Release Response. Note that it may be possible to perform operations 213-214 earlier, e.g., immediately after operation 209. Alternatively, it can also be possible to perform operations 213-214 later and let downlink frames be forwarded from the Source UPF 257 to the Target gNB 259 for a temporary period of time.

Note that the End marker (at 200f), sent after operation 213, may be optional according to some embodiments, and that the End marker may be omitted according to some embodiments. In the event that the End marker is omitted, the Target gNB 259 may not reorder the downlink frames, or alternatively, the Target gNB 259 may wait for a timeout period of time while it only sends forwarded frames to the UE 251, and after the timeout it stops sending forwarded frames and only delivers downlink frames from the Target UPF 259. Whether or not to use the End marker can be established based on configuration, which should be consistent in the system for a given UE whether or not End markers are expected to be used.

As discussed above regarding Anchor change for Ethernet PDU Sessions, the end marker may thus be omitted/skipped in case of UPF change. Different options are discussed below regarding how the RAN node (e.g., target gNB 255) may be made aware that it should not expect the end marker packets to arrive in case of UPF change for Ethernet PDU sessions.

The RAN node may be pre-configured to not expect an end marker. In a given deployment, the RAN node may be configured to not expect the end marker to arrive for any PDU session. This option may be well suited to local (e.g., factory) deployments.

The RAN node may be configured not to expect end marker for a set of network slices identified by the S-NSSAI provided for the given UE.

The RAN node may be configured not to expect end marker for a specific PDU Session type. The PDU Session Type may be provided to the RAN node.

The RAN node may be configured to not expect end marker for a set of RAT/Frequency Selection Priority RFSP indexes. The RFSP index is provided to the RAN node by the AMF and applies on a per UE basis.

The RAN node may be configured to not expect end marker for a PDU session that has a flow with a 5G ($5^{th}$ Generation) QoS (Quality of Service) Indicator 5QI out of a set of predefined 5QIs.

A new PDU Session parameter may be defined in the RAN node and in AMF entity/node 261 indicating whether to expect the end marker. If the 'no end marker' flag is indicated to the RAN node for a given PDU Session, the RAN node knows not to expect an end marker for that session. (Alternatively, a per UE flag can be defined.) The AMF may determine the flag based on subscription or local configuration, the AMF may maintain the result in its own UE context, and the AMF may provide the flag to the RAN node when the RAN context is established.

Of course, a combination of the above can also be used, e.g., the RAN node may be configured to not expect the end marker in case of a given combination of slice identifiers and PDU types.

As another embodiment, whether or not the RAN node should expect the end marker may be indicated individually at each change of the UPF together with the signaling that updates the N3 tunnel endpoint at the UPF. This may occur during the handover procedure, even though UPF change without handover could also be possible. Examples of UPF change with and without handover are illustrated in FIG. 6.11.2-1 of 3GPP TR 23.725 v2.0.0 (2018-December) section 6.11 (cited below).

Within the procedure of FIG. 6.11.2-1 of 3GPP TR 23.725, operations 9 and 10 in case of handover, and (optionally) operation 11 in case of no handover may include an additional flag which indicates to the RAN node whether or not it should expect the end marker when the UPF endpoint of the N3 tunnel is changed. In embodiments of FIG. 2, such a no end marker flag may be included in the messages of operations 211 and 212.

In case the RAN node is informed (using any of the approaches mentioned above) that it should not expect an end marker, the RAN node can deliver downlink packets as they arrive, no matter whether they arrive directly from the new (target) UPF or whether they arrive from the source UPF (either directly, or forwarded via the source RAN node in case of handover). In contrast, the RAN node can buffer new downlink packets (up to a threshold period of time) coming from the source UPF directly until the end marker has arrived on the old path (forwarded via the source RAN node).

In case the RAN node cannot determine whether the end marker is expected or not, it may decide to wait for a short period of time for the end marker and buffer new downlink packets coming from the UPF directly. I.e., in cases of uncertainty regarding the end marker, the threshold period of time to wait for the end marker may be reduced/lowered so that the RAN node avoids waiting too long for an end marker that never arrives. It may also be possible to not wait at all for the end marker in cases of uncertainty and deliver all downlink packets as they arrive without reordering.

FIGS. 3A-B and 4A-B illustrate embodiments of inventive concepts in dual connectivity DC settings where a Dual Connectivity feature is used in the RAN, and a single UE 351 connects to both a MgNB 353 (Master gNB) and a SgNB 355 (Secondary gNB). International App. No. PCT/IB2017/058517 describes situations where the UE maintains two PDU Sessions in parallel for redundancy both in the RAN and in the CN.

Figure 3A:
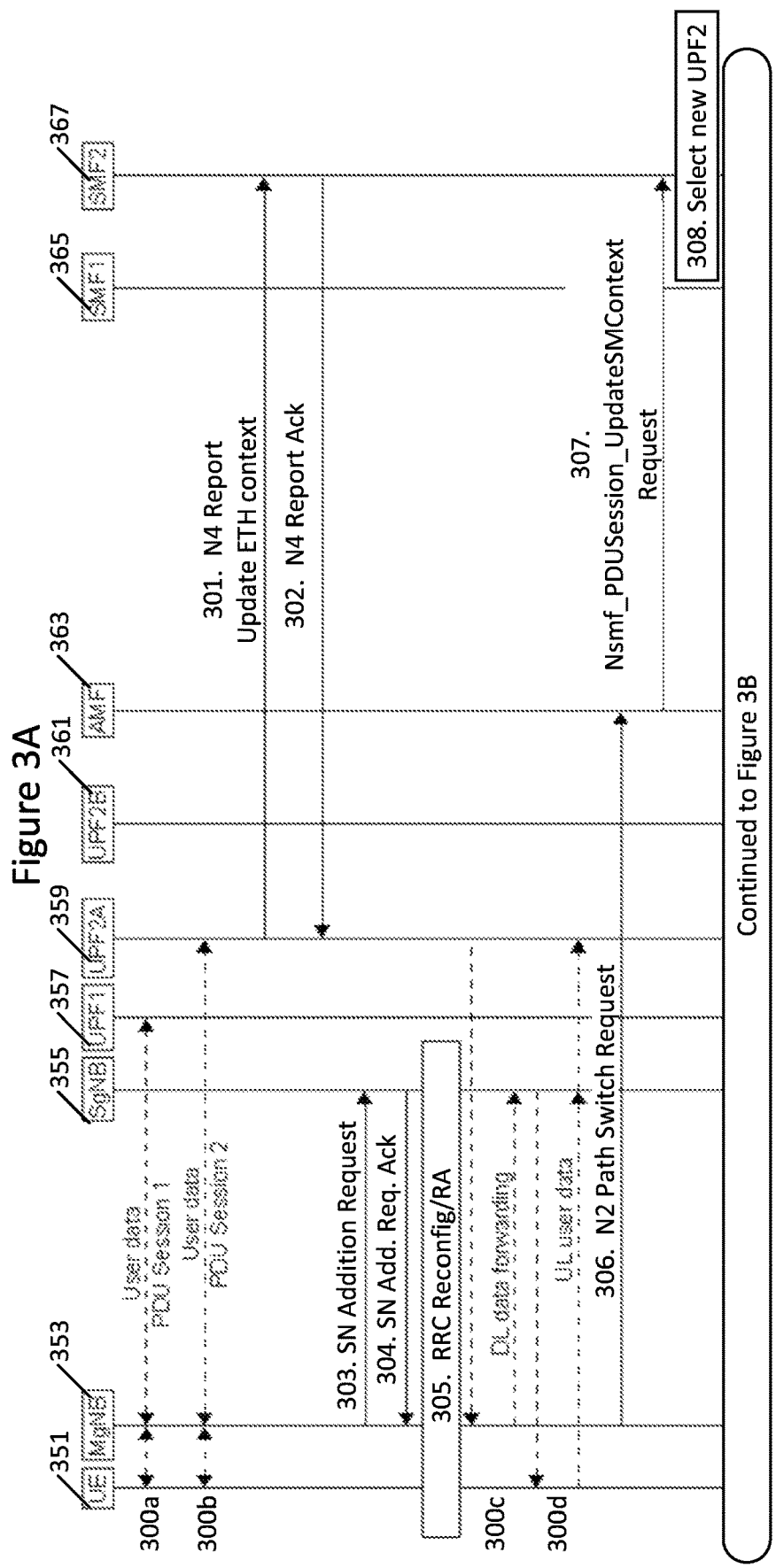
FIGS. 3A and 3B provide a signaling diagram illustrating network operations of handover of a dual connectivity PDU session according to some embodiments of inventive concepts.
Figure 3B:
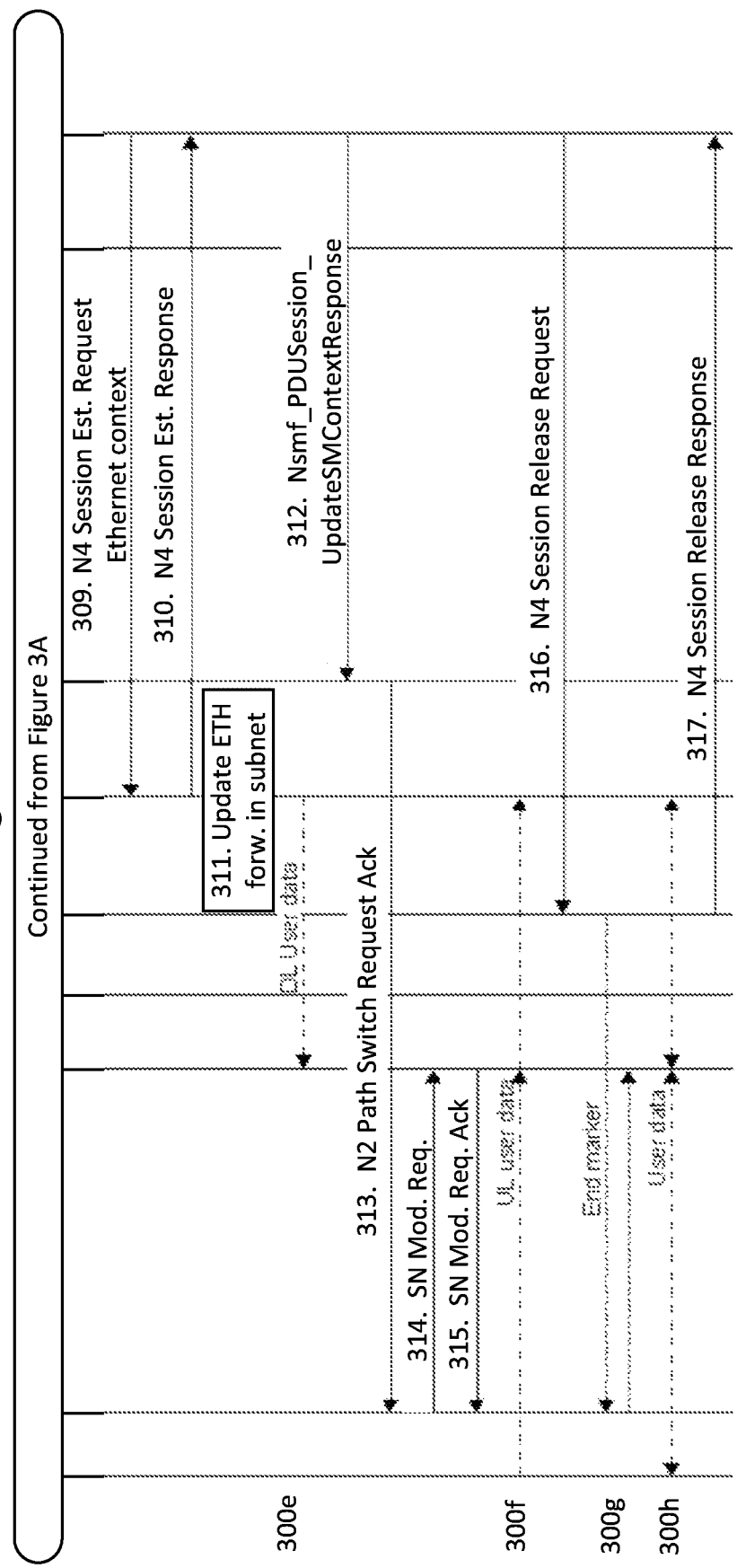

This signaling diagram of FIGS. 3A and 3B illustrates some embodiments applied to dual connectivity where a new Secondary gNB 355 is added. In the embodiment of FIGS. 3A-B, the UE 351 originally has two PDU Sessions, a first PDU session via MgNB and UPF1 at 300a, and a second PDU session via MgNB and UPF2A (referred to as secondary source UPF 359) at 300b. As discussed below, the second PDU session may be handed over from MgNB 353 and secondary source UPF 359 to SgNB 355 and secondary target UPF 361 (UPF2B). Operations of secondary source UPF 359 may be similar to operations discussed above with respect to source UPF 255, and operations of secondary target UPF 361 may be similar to operations discussed above with respect to target UPF 259.

301. The secondary source UPF 359 transmits an N4 Report to inform the SMF 367 about the Ethernet context (i.e., any information maintained related to the Ethernet network that the secondary source UPF 359 interfaces with). Specifically, the N4 Report may include a medium access control MAC address for the UE 351 that the secondary source UPF 359 has learned from the UE side. In case of any changes in the Ethernet context, the change is updated to the SMF 367 so that the SMF 367 maintains an up-to-date copy of the Ethernet context in the secondary source UPF 359 for the UE 351. This signaling may be realized using the N4 reporting procedure.

302. The SMF 367 acknowledges the source UPF report of operation 301, for example, using an N4 Report Acknowledge (Ack) transmitted from the SMF 367 to the secondary source UPF 359.

303. MgNB 353 may transmit a secondary node SN addition request to SgNB 355 to initiate additional of the secondary node SgNB to be used for PDU session 2.

304. SgNB 355 responds to the SN addition request with an SN addition request acknowledgment.

305. Radio Resource Control RRC Reconfiguration and/or random access RA may be performed to add the secondary node SgNB 355 for the PDU session 2. Downlink DL data forwarding may then be performed (at 300c) with downlink data from secondary source UPF 359 being forwarded from MgNB 353 to SgNB 355 for downlink DL transmission to UE 351 for PDU session 2, and uplink UL data may be transmitted from UE 351 through SgNB 355 to secondary source UPF 359 (at 300d) for PDU session 2.

306. MgNB 353 initiates transmission of an N2 Path Switch Request to the AMF 363 to perform the switching of the user plane in the CN.

307. The path switch is signaled from AMF 363 to SMF 367, for example, by transmitting a Nsmf_PDUSession_UpdateSMContext Request.

308. The SMF 367 decides that the PSA is to be changed for the Ethernet PDU Session 2, and selects the new UPF that will act as secondary Target UPF 361.

309. The secondary target UPF N4 session is established, including the RAN node's tunnel endpoint to be used between the SgNB 355 and the secondary target UPF 361. The Ethernet context is also sent from the SMF 367 to the secondary Target UPF 361, for example, by transmitting an N4 Session Establishment Request.

310. The establishment of the new N4 session is acknowledged from the secondary Target UPF 361 to the SMF 367, for example, by transmitting an N4 Session Establishment Response.

311. The Ethernet forwarding is updated in the Ethernet subnetwork. This can be performed by the secondary Target UPF 361 generating a new Ethernet frame with the MAC address for UE 351 as the source in case the Ethernet network uses MAC learning, or by instructing a central controller of the Ethernet network that the given MAC address is reachable at the new location in the event that a central controller in the Ethernet network is used to set the forwarding tables of the Ethernet network. In case of multiple MAC addresses for UE 351, the process may be repeated for each MAC address. From this point on, downlink frames for the UE 351 using PDU session 2 may be forwarded towards the SgNB 259 (at 300e). Further discussion/options to update Ethernet forwarding are discussed above.

312. Path switch may be acknowledged from the SMF 367 to the AMF 363 using an Nsmf_PDUSession_UpdateSMContextResponse. This signaling may also include the tunnel endpoint at the secondary target UPF 361 for the SgNB 355 to secondary target UPF 361 tunnel.

313. Path switch may be acknowledged from the AMF 363 to the MgNB 353 using an N2 Path Switch Request Ack. This signaling also includes the tunnel endpoint at the secondary target UPF 361 for the SgNB 355 to secondary target UPF 361 tunnel.

314. MgNB 353 may transmit a secondary node SN modification request to SgNB 355.

315. SgNB 355 may reply with an SN Modification Request Acknowledgement. From this point on, uplink frames from the UE 351 can pass via the SgNB 355 and the secondary Target UPF 361 (at 300f) using PDU session 2.

316. The N4 session is released at the secondary Source UPF 359, for example, using an N4 Session release request. This triggers the secondary Source UPF 359 to send an end marker via MgNB 353 to the SgNB 355 (at 300g), helping SgNB 355 deliver frames in order. After this, SgNB 355 knows that it does not need to expect further frames from the MgNB 353. The user plane for PDU session 2 is now switched and user data is now communicated via SgNB 355 and secondary Target UPF 361 in both uplink and downlink (at 300h).

317. The N4 session release is acknowledged from the secondary source UPF 359 to the SMF 367 using an N4 Session Release Response. Note that it may be possible to perform operations 316-317 earlier, e.g., immediately after operation 310. Alternatively, it can also be possible to perform operations 316-317 later and let downlink frames be forwarded from the secondary Source UPF 359 to SgNB 355 for a temporary period of time.

In the diagram of FIGS. 3A-B, operations 306-313 and 316-317 may be similar to operations 205-214. In operations 314 and 315 from the diagram of FIGS. 3A-B, however, the uplink tunnel endpoint at the new PDU Session Anchor UPF2 (secondary target UPF 361) is sent from the MgNB 353 to the SgNB 355, as SgNB 355 is the node terminating the tunnel.

Figure 4A:
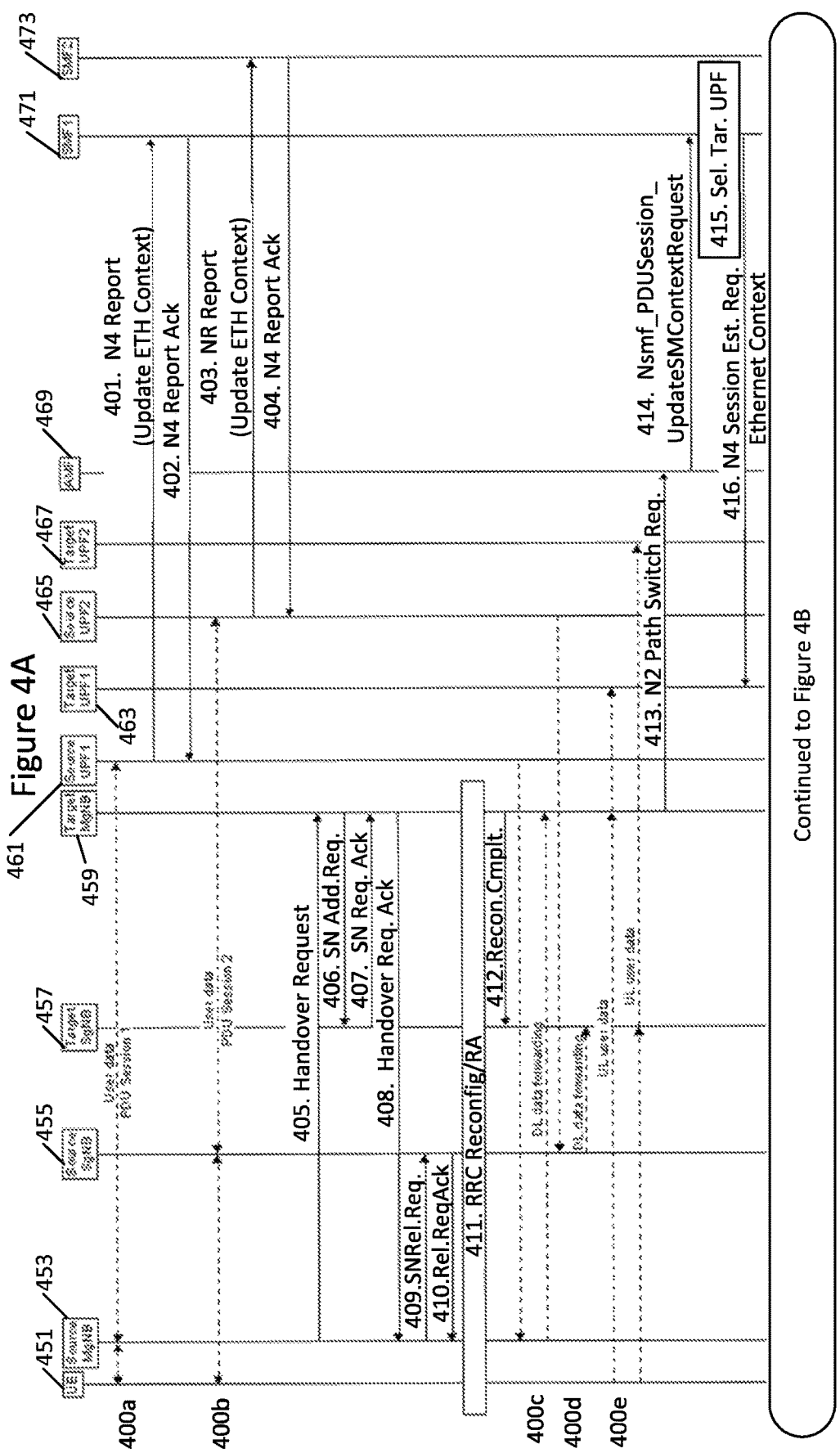
FIGS. 4A and 4B provide a signaling diagram illustrating network operations of handover of dual connectivity PDU sessions according to some embodiments of inventive concepts.
Figure 4B:
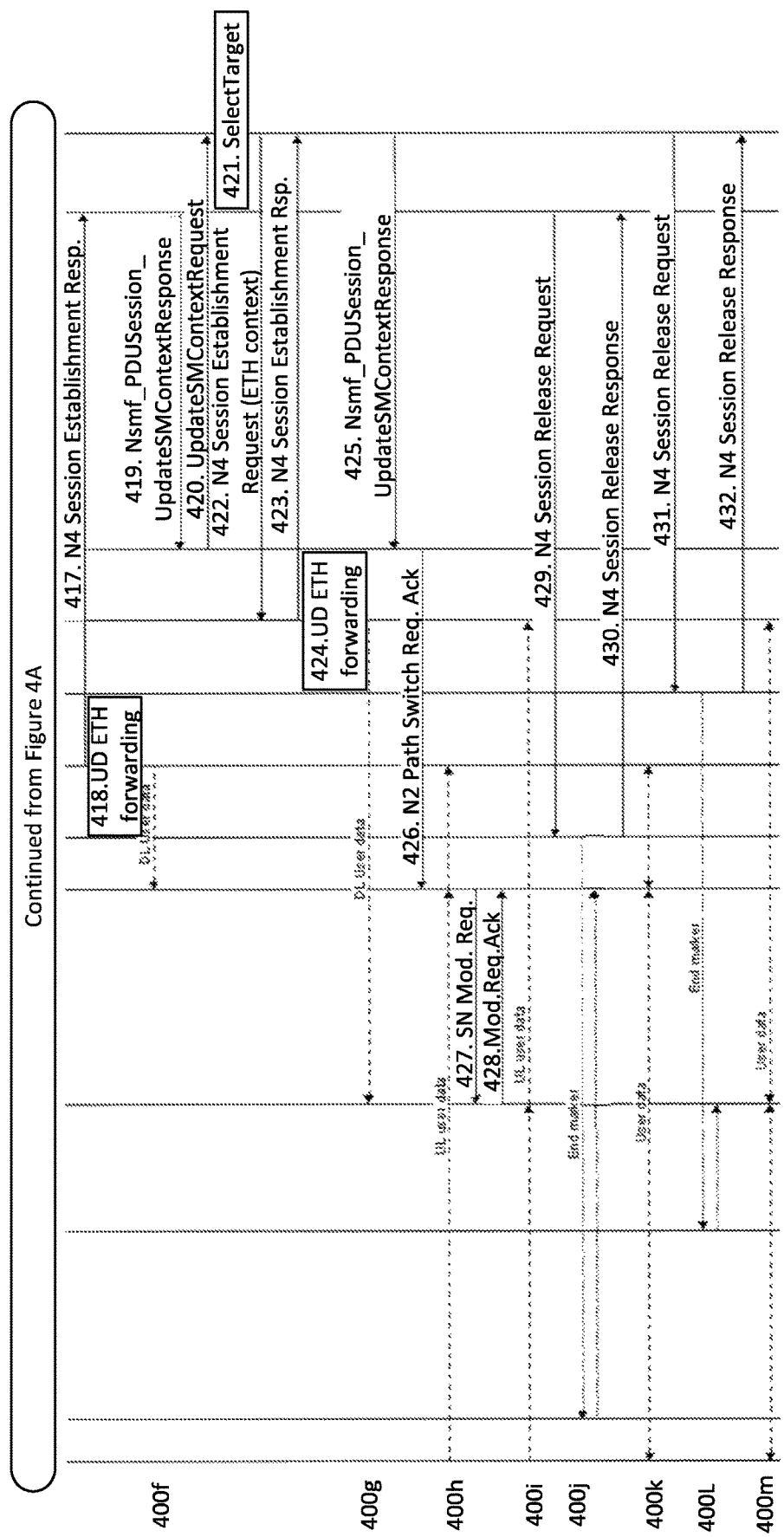

The signaling diagram of FIGS. 4A and 4B illustrates some embodiments applied to combined dual connectivity handover where the MgNB and SgNB are both changed (and the case that the SgNB does not change can be regarded as a special case of this scenario). The handover itself with dual connectivity may be performed according to 3GPP TS 37.340 section 10.7.2. As shown, a first PDU session is set up via source MgNB 453 and source primary UPF 461 (at 400a), and a second PDU session is set up via source SgNB 455 and source secondary UPF 465 (at 400b), in line with international application number PCT/IB2017/058517. Embodiments of the present disclosure may be performed accordingly for both first and second PDU Sessions, as discussed below with respect to FIGS. 4A and 4B.

401. Source primary UPF 461 transmits an N4 Report to inform SMF 471 about the Ethernet context (i.e., any information maintained related to the Ethernet network that the Source primary UPF 461 interfaces with). Specifically, the N4 Report may include a medium access control MAC address for the UE 451 that the Source primary UPF 461 has learned from the UE side. In case of any changes in the Ethernet context, the change is updated to SMF 471 so that SMF 471 maintains an up-to-date copy of the Ethernet context in the source primary UPF 461 for the UE 451. This signaling may be realized using the N4 reporting procedure.

402. SMF 471 acknowledges the source primary UPF report of operation 401, for example, using an N4 Report Acknowledge (Ack) transmitted from SMF 471 to the source primary UPF 461.

403. Source secondary UPF 465 transmits an N4 Report to inform SMF 473 about the Ethernet context (i.e., any information maintained related to the Ethernet network that the Source secondary UPF 465 interfaces with). Specifically, the N4 Report may include a medium access control MAC address for the UE 451 that the Source secondary UPF 465 has learned from the UE side. In case of any changes in the Ethernet context, the change is updated to SMF 473 so that SMF 473 maintains an up-to-date copy of the Ethernet context in the source secondary UPF 465 for the UE 451. This signaling may be realized using the N4 reporting procedure.

404. SMF 473 acknowledges the source secondary UPF report of operation 403, for example, using an N4 Report Acknowledge (Ack) transmitted from SMF 473 to the source secondary UPF 461.

405. Source MgNB 453 transmits a handover request to target MgNB 459.

406. Target MgNB 459 transmits a secondary node SN addition request to target SgNB 457.

407. Target SgNB 457 transmits an SN addition request acknowledgement (ACK) to target MgNB 459.

408. Target MgNB 459 transmits a handover request acknowledgement (ACK).

409. Source MgNB 453 transmits an SN release request to source SgNB 455.

410. Source SgNB 455 transmits an SN release request acknowledgement (ACK).

411. Radio Resource Control RRC reconfiguration and/or random access RA may be performed to add target MgNB for the first PDU session and to added target SgNB 457 for the second PDU session. Downlink DL data forwarding may be performed (at 400c) with downlink data from source primary UPF 461 being forwarded from source MgNB 453 to target MgNB 459 for downlink DL transmission to UE 451 for the first PDU session. Downlink DL data forwarding may be performed (at 400d) with downlink data from source secondary UPF 465 being forwarded from source SgNB 455 to target SgNB 457 for downlink DL transmission to UE 451 for the second PDU session. Uplink UL data may be transmitted (at 400e) from UE 451 through target MgNB 459 to target primary UPF 463 (at 300d) for the first PDU session and through target SgNB 457 to target secondary UPF 467 for the second PDU session.

412. Target MgNB 459 may transmit an SN reconfiguration complete message to target SgNB 457 to complete the radio handover. Accordingly, target MgNB 459 adds target SgNB 457, and source MgNB 453 releases source SgNB 455. Note however that source and target SgNBs 455 and 457 may coincide in some cases. Data forwarding may be performed both from source MgNB 453 to target MgNB 459, as described in TS 37.340, and additionally also from source SgNB 455 to target SgNB 457 as a new feature.

413. Target MgNB 459 initiates transmission of an N2 Path Switch Request to the AMF 469 to perform the switching of the user plane in the CN. The Path Switch request of operation 413 may initiate the PSA change for both PDU sessions as discussed with respect to operations 414-419 for the first PDU session and as discussed with respect to operation 420-425 for the second PDU session.

414. The path switch is signaled from AMF 469 to SMF 471, for example, by transmitting a Nsmf_PDUSession_UpdateSMContext Request.

415. SMF 471 decides that the PSA is to be changed for the first Ethernet PDU Session, and selects the new UPF that will act as Target primary UPF 463.

416. The Target primary UPF N4 session is established for the first PDU session, including the RAN node's tunnel endpoint to be used between the target MgNB 459 and the target primary UPF 463. The Ethernet context is also sent from the SMF 471 to the Target primary UPF 463, for example, by transmitting an N4 Session Establishment Request (including the Ethernet context).

417. The establishment of the new N4 session is acknowledged from the Target primary UPF 463 to the SMF 471, for example, by transmitting an N4 Session Establishment Response.

418. The Ethernet forwarding is updated in the Ethernet subnetwork for the first PDU session. This can be performed by the Target primary UPF 463 generating a new Ethernet frame with the MAC address for UE 451 as the source in case the Ethernet network uses MAC learning, or by instructing a central controller of the Ethernet network that the given MAC address is reachable at the new location in the event that a central controller in the Ethernet network is used to set the forwarding tables of the Ethernet network. In case of multiple MAC addresses for UE 451, the process may be repeated for each MAC address. From this point on, downlink frames for the UE 451 may be forwarded towards the Target MgNB 459 (at 4000. Further discussion/options to update Ethernet forwarding are discussed above.

419. Path switch may be acknowledged from the SMF 471 to the AMF 469 using an Nsmf_PDUSession_UpdateSMContextResponse. This signaling may also include the tunnel endpoint at the target primary UPF 463 for the target MgNB 459 to target primary UPF 463 tunnel.

420. The path switch is signaled from AMF 469 to SMF 473, for example, by transmitting a Nsmf_PDUSession_UpdateSMContext Request (shortened in FIG. 4B to UpdateSMContext Request).

421. SMF 473 decides that the PSA is to be changed for the second Ethernet PDU Session, and selects the new UPF that will act as Target secondary UPF 467.

422. The Target secondary UPF N4 session is established for the second PDU session, including the RAN node's tunnel endpoint to be used between the target SgNB 457 and the target secondary UPF 467. The Ethernet context is also sent from the SMF 473 to the Target secondary UPF 467, for example, by transmitting an N4 Session Establishment Request (including the Ethernet context).

423. The establishment of the new N4 session is acknowledged from the Target secondary UPF 467 to the SMF 473, for example, by transmitting an N4 Session Establishment Response.

424. The Ethernet forwarding is updated in the Ethernet subnetwork for the second PDU session. This can be performed by the Target secondary UPF 467 generating a new Ethernet frame with the MAC address for UE 451 as the source in case the Ethernet network uses MAC learning, or by instructing a central controller of the Ethernet network that the given MAC address is reachable at the new location in the event that a central controller in the Ethernet network is used to set the forwarding tables of the Ethernet network. In case of multiple MAC addresses for UE 451, the process may be repeated for each MAC address. From this point on, downlink frames for the UE 451 may be forwarded towards the Target SgNB 457 (at 400g). Further discussion/options to update Ethernet forwarding are discussed above.

425. Path switch may be acknowledged from the SMF 473 to the AMF 469 using an Nsmf_PDUSession_UpdateSMContextResponse. This signaling may also include the tunnel endpoint at the target secondary UPF 467 for the target SgNB 457 to target secondary UPF 467 tunnel.

426. Path switch may be acknowledged from the AMF 471 to the Target MgNB 459 using an N2 Path Switch Request Ack. The Path Switch Request Ack carries the information of the tunnel endpoints for both PDU sessions. Accordingly, this signaling includes the tunnel endpoint at the target primary UPF 463 for the target MgNB 459 to target primary UPF 463 tunnel for the first PDU session, and the tunnel endpoint at the target secondary UPF 467 for the target SgNB 457 to target secondary UPF 467 tunnel for the second PDU session. From this point on, uplink frames from the UE 451 can pass via the Target MgNB 459 and the Target primary UPF 463 (at 400h).

427. For the second PDU session, the target SgNB 457 is informed about the tunnel endpoints using an SN modification request.

428. The target SgNB 457 responds with an SN modification request acknowledgment. From this point on, uplink frames from the UE 451 can pass via the Target SgNB 457 and the Target secondary UPF 467 (at 400i).

429. The first N4 PDU session is released at the Source primary UPF 461, for example, using an N4 Session release request. This may trigger the Source primary UPF 461 to send an end marker via the Source MgNB 453 to the Target MgNB 459 (at 400j), helping the Target MgNB 459 deliver frames in order. After this, the Target MgNB 459 knows that it does not need to expect further frames from the Source MgNB 453. The user plane is now switched and user data is now communicated via Target MgNB 459 and Target primary UPF 463 in both uplink and downlink (at 400k).

430. The N4 session release is acknowledged from the source primary UPF 461 to the SMF 471 using an N4 Session Release Response. Note that it may be possible to perform operations 429-430 earlier, e.g., immediately after operation 417. Alternatively, it can also be possible to perform operations 429-430 later and let downlink frames be forwarded from the Source primary UPF 461 to the Target MgNB 459 for a temporary period of time. Operations 429 and 430 may thus be performed in different order, and these operations may overlap with previous operations. The end markers can optionally be sent for reordering purposes.

431. The second N4 PDU session is released at the Source secondary UPF 465, for example, using an N4 Session release request. This may trigger the Source secondary UPF 465 to send an end marker via the Source SgNB 455 to the Target SgNB 457 (at 400L), helping the Target SgNB 457 deliver frames in order. After this, the Target SgNB 457 knows that it does not need to expect further frames from the Source SgNB 455. The user plane is now switched and user data is now communicated via Target SgNB 457 and Target secondary UPF 467 in both uplink and downlink (at 400m).

432. The N4 session release is acknowledged from the source secondary UPF 465 to the SMF 473 using an N4 Session Release Response. Note that it may be possible to perform operations 431-432 earlier, e.g., immediately after operation 423. Alternatively, it can also be possible to perform operations 431-432 later and let downlink frames be forwarded from the Source secondary UPF 465 to the Target SgNB 457 for a temporary period of time. Operations 431 and 432 may thus be performed in different order, and these operations may overlap with previous operations. The end markers can optionally be sent for reordering purposes. In the end, the user planes are reconfigured for both of the first and second PDU Sessions.

According to some embodiments of inventive concepts, an Ethernet PDU session may change its PDU Session Anchor (PSA) such that:

The Core Network (CN) Control Plane establishes a new PSA;

The new PSA is informed about the Ethernet context including the UE's MAC address, from the CN Control plane, and the CN Control Plane acquires the Ethernet context from the old PSA;

The new PSA updates the Ethernet forwarding in the Ethernet subnet, either by sending an Ethernet frame in the local subnet, or by informing a central controller; and/or The new PSA's tunnel endpoint is signaled to the RAN node, which switches the tunnel to the new PSA.

Operations of session management function SMF entity (also referred to as an SMF node/server) of a wireless communication network (e.g., SMF entity 263 of FIG. 2) will now be discussed with reference to the flow chart of FIG. 8. For example, the SMF entity may be implemented using the structure of FIG. 7 with modules stored in memory 905 so that the modules provide instructions so that when the instructions of a module are executed by processor 903, processor 903 performs respective operations. Processor 903 of the SMF entity may thus transmit and/or receive communications to/from one or more other network nodes/entities/servers of a wireless communication network through network interface 907.

At block 851, processor 903 may receive an N4 report including an Ethernet context for a wireless terminal UE (e.g., wireless terminal 251 of FIG. 2) from a first user plane function UPF entity (e.g., source UPF entity 257 of FIG. 2) through network interface 907. The Ethernet context may be provided for an Ethernet Protocol Data Unit PDU Session for the wireless terminal using the first UPF entity, and the Ethernet context may include a Medium Access Control MAC address for the wireless terminal UE. Operations of block 851 may be performed as discussed above, for example, with respect to operation 201 of FIG. 2, operation 301 of FIG. 3A, operation 401 of FIG. 4A, and/or operation 403 of FIG. 4A.

At block 853, processor 903 may transmit an N4 report acknowledgment (ACK) through network interface 907 to the first UPF entity. Operations of block 853 may be performed as discussed above, for example, with respect to operation 202 of FIG. 2, operation 302 of FIG. 3A, operation 402 of FIG. 4A, and/or operation 404 of FIG. 4A.

At block 855, processor 903 may receive a request to switch the Ethernet PDU session for the wireless terminal from an AMF entity (e.g., AMF entity 261 of FIG. 2) through network interface 907. Operations of block 855 may be performed as discussed above, for example, with respect to operation 206 of FIG. 2, operation 307 of FIG. 3A, operation 414 of FIG. 4A, and/or operation 420 of FIG. 4B.

At block 857, processor 903 may select a second UPF entity (e.g., target UPF entity 259 of FIG. 2) responsive to receiving the request to switch the Ethernet PDU session for the wireless terminal. Operations of block 857 may be performed as discussed above, for example, with respect to operation 207 of FIG. 2, operation 308 of FIG. 3A, operation 415 of FIG. 4A, and/or operation 421 of FIG. 4B.

At block 859, processor 903 may transmit an N4 session establishment request including the Ethernet context including the MAC address for the wireless terminal through network interface 907 to the second UPF entity. The N4 session establishment request may be transmitted responsive to selecting the second UPF entity. Operations of block 859 may be performed as discussed above, for example, with respect to operation 208 of FIG. 2, operation 309 of FIG. 3B, operation 416 of FIG. 4A, and/or operation 422 of FIG. 4B.

At block 861, processor 903 may receive an N4 session establishment response through network interface 907. Operations of block 861 may be performed as discussed above, for example, with respect to operation 209 of FIG. 2, operation 310 of FIG. 3B, operation 417 of FIG. 4B, and/or operation 423 of FIG. 4B.

At block 863, processor 903 may transmit an acknowledgement of the request to switch through network interface 907 to the AMF entity after selecting the second UPF entity, and the acknowledgment may include an identification of the second UPF entity. Operations of block 863 may be performed as discussed above, for example, with respect to operation 211 of FIG. 2, operation 312 of FIG. 3B, and/or operation 425 of FIG. 4B.

At block 865, processor 903 may transmit a session release request for the wireless terminal through network interface 907 to the first UPF entity (source UPF) responsive to selecting the second UPF entity. Operations of block 865 may be performed as discussed above, for example, with respect to operation 213 of FIG. 2, operation 316 of FIG. 3B, operation 429 of FIG. 4B, and/or operation 431 of FIG. 4B.

At block 867, processor 903 may receive a session release response from the first UPF entity through network interface 907. Operations of block 867 may be performed as discussed above, for example, with respect to operation 214 of FIG. 2, operation 317 of FIG. 3B, operation 430 of FIG. 4B, and/or operation 432 of FIG. 4B.

The Ethernet context may be provided for the Ethernet PDU Session for the wireless terminal using the first UPF entity and using a first base station (e.g., source gNB 253), wherein the request to switch the Ethernet PDU session for the wireless terminal may include an identification of a second base station (e.g., target gNB 255) different than the first base station, and wherein selecting the second UPF entity (e.g., target UPF 259) comprises selecting the second UPF entity based on the identification of the second base station.

The Ethernet context at block 851 may include a plurality of MAC addresses for the wireless terminal, and transmitting the Ethernet context at block 859 may include transmitting the Ethernet context including the plurality of MAC addresses.

Figure 8:
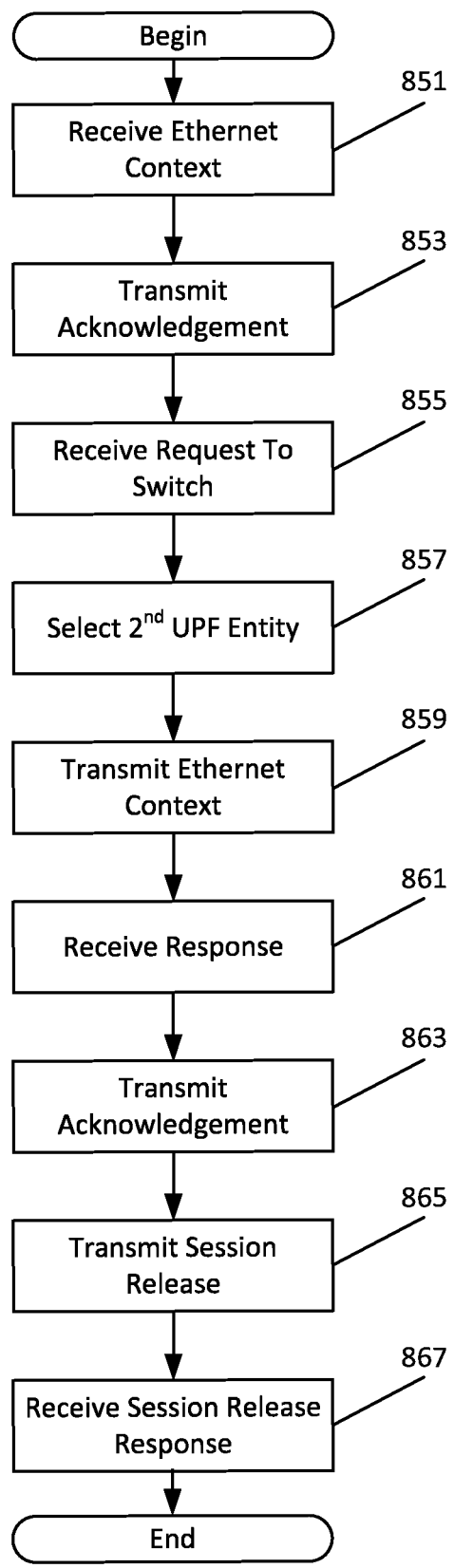
FIG. 8 is a flow chart illustrating operations of an SMF network entity according to some embodiments of inventive concepts.

Various operations of FIG. 8 may be optional with respect to some embodiments of inventive concepts. For example, operations 853, 855, 857, 861, 863, 865, and/or 867 of FIG. 8 may be optional with respect to Example Embodiment 1 discussed below.

Operations of user plane function entity (also referred to as an UPF node/server) of a wireless communication network (e.g., UPF entity 259 of FIG. 2) will now be discussed with reference to the flow chart of FIG. 9. For example, the UPF entity may be implemented using the structure of FIG. 7 with modules stored in memory 905 so that the modules provide instructions so that when the instructions of a module are executed by processor 903, processor 903 performs respective operations. Processor 903 of the UPF entity may thus transmit and/or receive communications to/from one or more other network nodes/entities/servers of a wireless communication network through network interface 907.

At block 951, processor 903 may receive a request to establish an Ethernet Protocol Data Unit PDU Session for a wireless terminal (e.g., wireless terminal UE 251 of FIG. 2) using an Ethernet network, and the request to establish the Ethernet PDU Session may include a Medium Access Control MAC address for the wireless terminal. The request may be received from an SMF entity (e.g., SMF entity 263 of FIG. 2) through network interface 907 as an N4 session establishment request. Moreover, the request may include an Ethernet context for the wireless terminal, and the Ethernet context may include the MAC address for the wireless terminal. Operations of block 951 may be performed as discussed above, for example, with respect to operation 208 of FIG. 2, operation 309 of FIG. 3B, operation 416 of FIG. 4A, and/or operation 422 of FIG. 4B.

At block 953, processor 903 may transmit an N4 session establishment response through network interface 907 to the SMF entity. Operations of block 953 may be performed as discussed above, for example, with respect to operation 209 of FIG. 2, operation 310 of FIG. 3B, operation 417 of FIG. 4B, and/or operation 423 of FIG. 4B.

At block 955, processor 903 may update forwarding for the wireless terminal in the Ethernet network using the MAC address for the wireless terminal responsive to receiving the request. According to some embodiments, updating forwarding for the wireless terminal may include flooding the Ethernet network with a frame including the MAC address of the wireless terminal as a source of the frame. According to some other embodiments, updating forwarding for the wireless terminal may include transmitting an instruction to a controller of the Ethernet network to forward downlink traffic for the wireless terminal through the UPF entity. Operations of block 955, may be performed as discussed above, for example, with respect to operation 210 of FIG. 2, operation 311 of FIG. 3B, operation 418 of FIG. 4B, and/or operation 424 of FIG. 4B.

At block 957, processor 903 may establish the Ethernet PDU session for the wireless terminal to support data communication between the wireless terminal and the Ethernet network through a base station (e.g., target gNB 255 of FIG. 2) and the UPF entity responsive to the request. At block 959, processor 903 may provide communication of data between the wireless terminal and the Ethernet network using the Ethernet PDU session through the base station (e.g., target gNB 255 of FIG. 2) and the UPF entity (e.g., target UPF entity 259 of FIG. 2). Operations of blocks 957 and 959 may be performed as discussed above, for example, with respect to operations 200*d*, 200*e* and/or 200*g* of FIG. 2, operations 300*e*, 300*f*, and/or 300*h* of FIG. 3B, operations 400*f*, 400*h*, and/or 400*k* of FIG. 4B, and/or operations 400*g*, 400*i*, and/or 400*m* of FIG. 4B.

Figure 9:
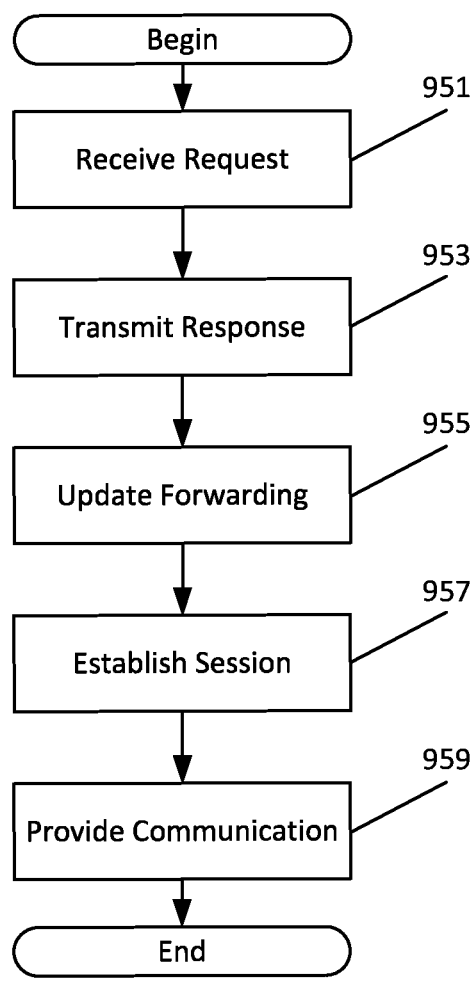
FIG. 9 is a flow chart illustrating operations of a target UPF entity according to some embodiments of inventive concepts.

Various operations of FIG. 9 may be optional with respect to some embodiments of inventive concepts. For example, operations 953, 957, and/or 959 of FIG. 9 may be optional with respect to Example Embodiment 9 discussed below.

Operations of user plane function entity (also referred to as an UPF node/server) of a wireless communication network (e.g., UPF entity 257 of FIG. 2) will now be discussed with reference to the flow chart of FIG. 10. For example, the UPF entity may be implemented using the structure of FIG. 7 with modules stored in memory 905 so that the modules provide instructions so that when the instructions of a module are executed by processor 903, processor 903 performs respective operations. Processor 903 of the UPF node may thus transmit and/or receive communications to/from one or more other network nodes/entities/servers of a wireless communication network through network interface 907.

At block 1051, processor 903 may establish an Ethernet PDU session for a wireless terminal (e.g., wireless terminal 251 of FIG. 2) to support data communication between the wireless terminal and an Ethernet network through a base station 253 and the UPF entity 257. At block 1053, processor 903 may provide communication of data through network interface 907 between the wireless terminal and the Ethernet network using the Ethernet PDU session through the base station 253 and the UPF entity 257. Operations of blocks 1051 and/or 1053 may be performed as discussed above, for example, with respect to operation 200*a* of FIG. 2, operation 300*b* of FIG. 3A, operation 400*a* of FIG. 4A, and/or operation 400*b* of FIG. 4A.

At block 1055, processor 903 may transmit an N4 reporting including an Ethernet context for the wireless terminal through network interface 907 to a session management function SMF entity (263) of the wireless communication network, wherein the Ethernet context includes a Medium Access Control MAC address for the wireless terminal.

Operations of block 1055 may be performed as discussed above, for example, with respect to operation 201 of FIG. 2, operation 301 of FIG. 3A, operation 401 of FIG. 4A, and/or operation 403 of FIG. 4A.

At block 1057, processor 903 may receive an N4 report acknowledgement from the SMF entity through network interface 907. Operations of block 1057 may be performed as discussed above, for example, with respect to operation 202 of FIG. 2, operation 302 of FIG. 3, operation 402 of FIG. 4A, and/or operation 404 of FIG. 4A.

At block 1059, processor 903 may receive an N4 session release request from the SMF entity through network interface 907, and responsive to receiving the session release request, processor 903 may release the Ethernet PDU session for the wireless terminal at block 1061. Operations of blocks 1059 and 1061 may be performed as discussed above, for example, with respect to operation 213 of FIG. 2, operation 316 of FIG. 3B, operation 429 of FIG. 4B, and/or operation 431 of FIG. 4B.

At block 1063, processor 903 may transmit an end marker for the Ethernet PDU session for the wireless terminal through network interface 907 responsive to the session release request. More particularly, the base station is a first/source base station 253, and the end marker may be transmitted to the first/source base station for retransmission to a second/target base station 255. Operations of block 1063 may be performed as discussed above, for example, with respect to operation 200f of FIG. 2, operation 300g of FIG. 3B, operation 400j of FIG. 4B, and/or operation 400L of FIG. 4B.

Moreover, providing communication at block 1053 may include providing communication of data between the wireless terminal 251 and the Ethernet network using the Ethernet PDU session through the base station 253 and the UPF entity 257 before and after receiving the session release request from the SMF entity at block 1059.

Figure 10:
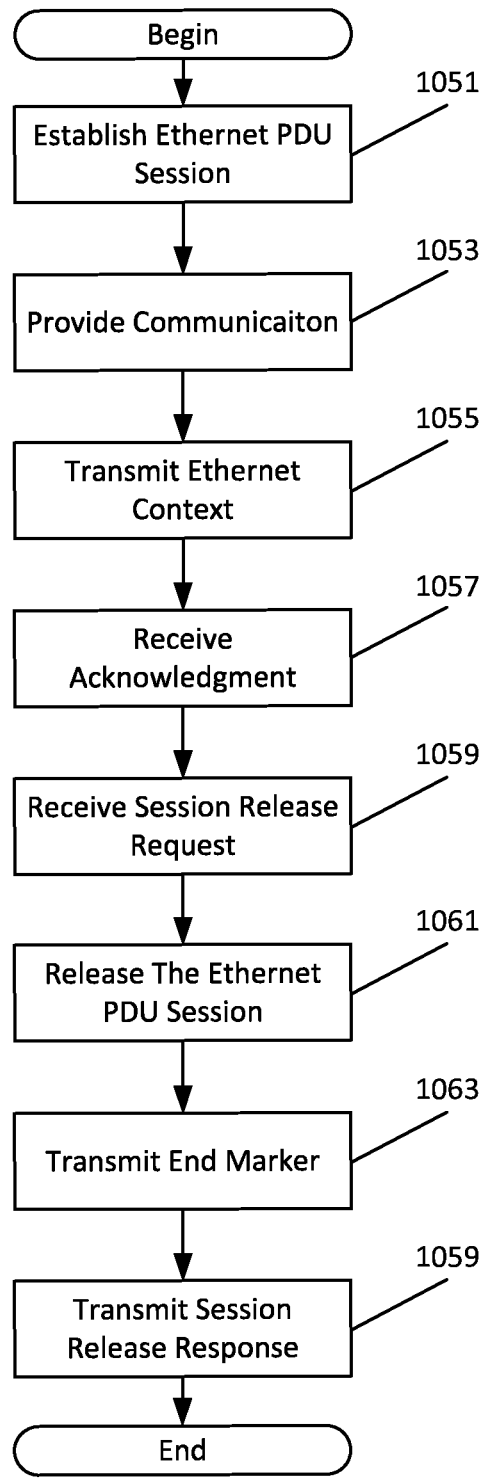
FIG. 10 is a flow chart illustrating operations of a source UPF entity according to some embodiments of inventive concepts.

Various operations of FIG. 10 may be optional with respect to some embodiments of inventive concepts. For example, operations 1053, 1057, 1059, 1063, and/or 1065 of FIG. 10 may be optional with respect to Example Embodiment 16 discussed below.

Figure 11:
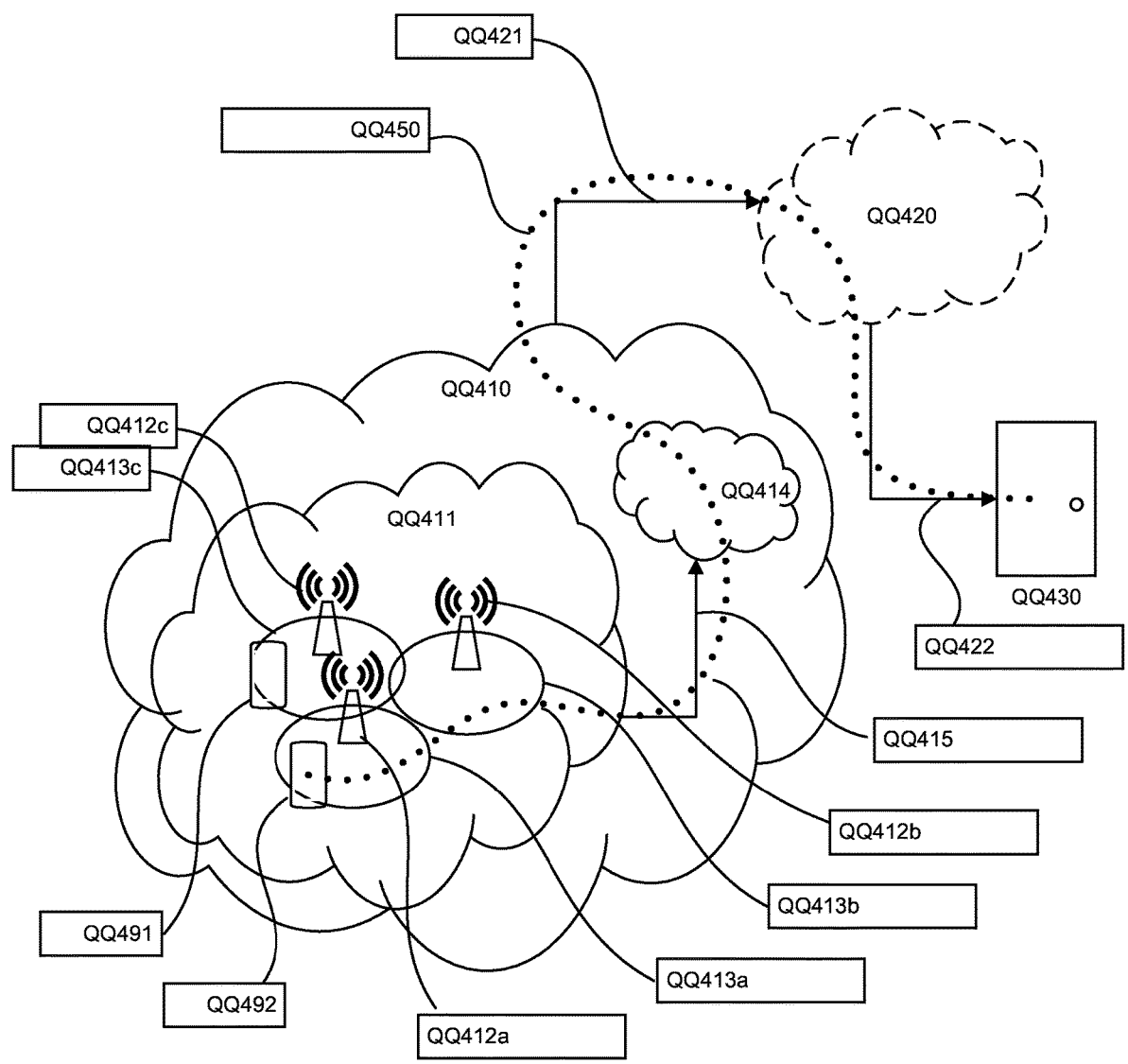
FIG. 11 is a schematic diagram illustrating a telecommunication network connected via an intermediate network to a host computer in accordance with some embodiments.

With reference to FIG. 11, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 11 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 12. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 12) served by base station QQ520. Communication interface QQ526 may be configured to facilitate connection QQ560 to host computer QQ510. Connection QQ560 may be direct or it may pass through a core network (not shown in FIG. 12) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 12:
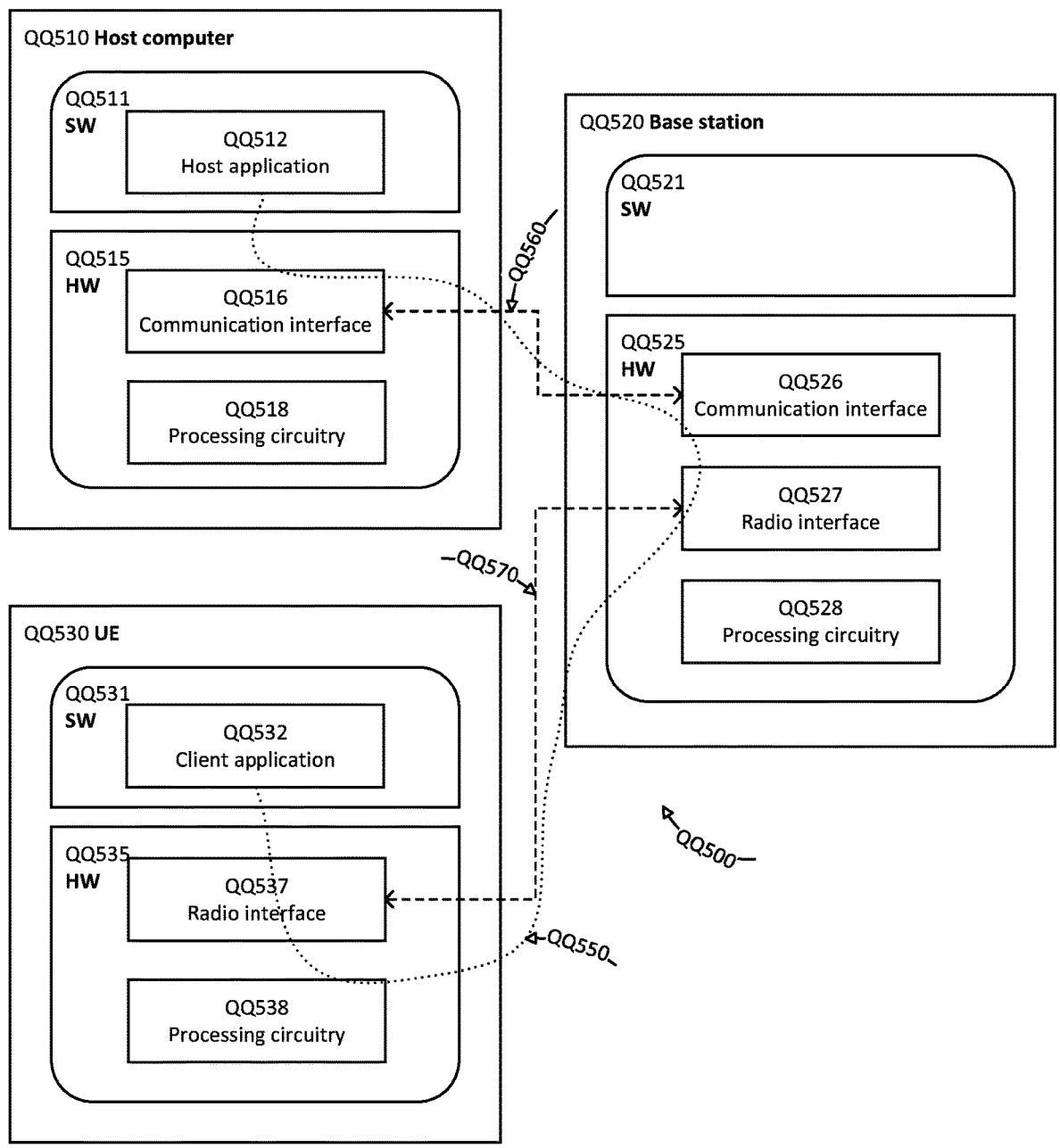
FIG. 12 is a block diagram illustrating a host computer communicating via a base station with a user equipment over a partially wireless connection in accordance with some embodiments.

It is noted that host computer QQ510, base station QQ520 and UE QQ530 illustrated in FIG. 12 may be similar or identical to host computer QQ430, one of base stations QQ412a, QQ412b, QQ412c and one of UEs QQ491, QQ492 of FIG. 11, respectively. This is to say, the inner workings of these entities may be as shown in FIG. 12 and independently, the surrounding network topology may be that of FIG. 11.

In FIG. 12, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may provide redundancy for uplink/downlink communications through the wireless communication network and thereby provide benefits such as improved reliability.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 13:
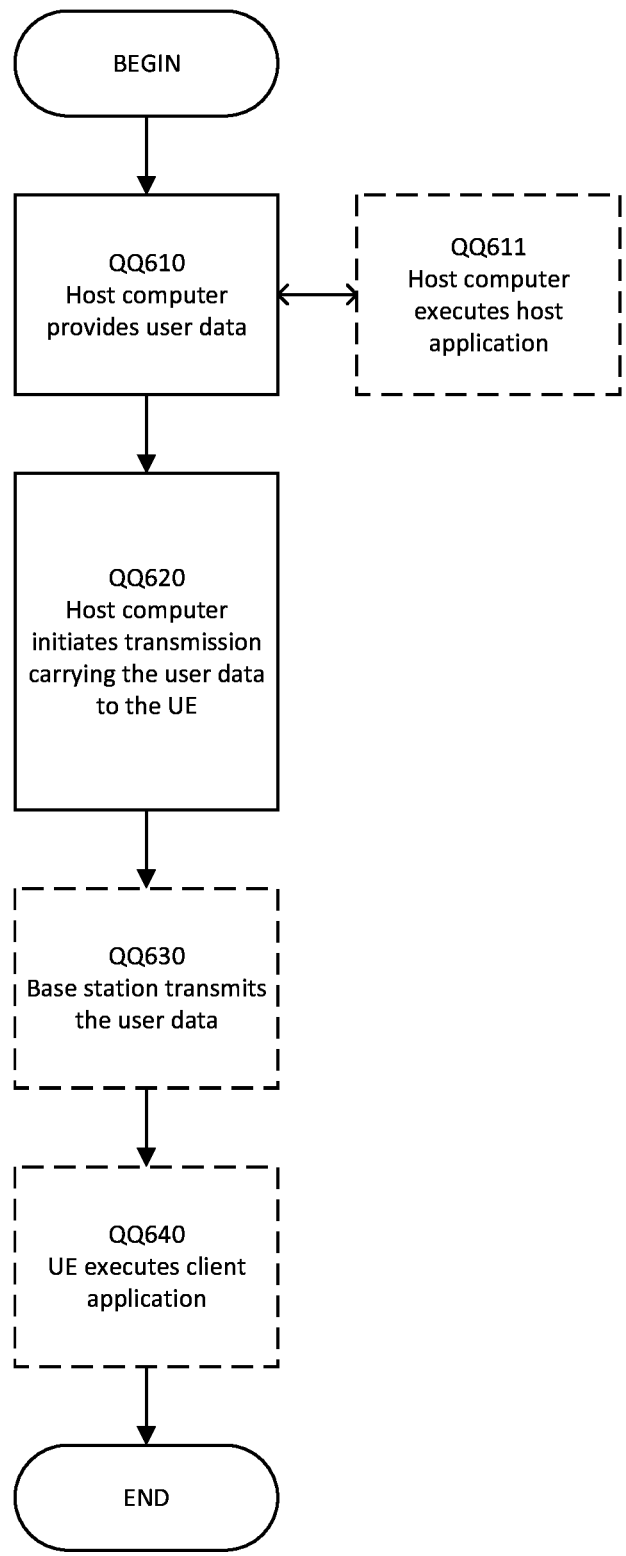
FIG. 13 is a flow chart illustrating methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 14:
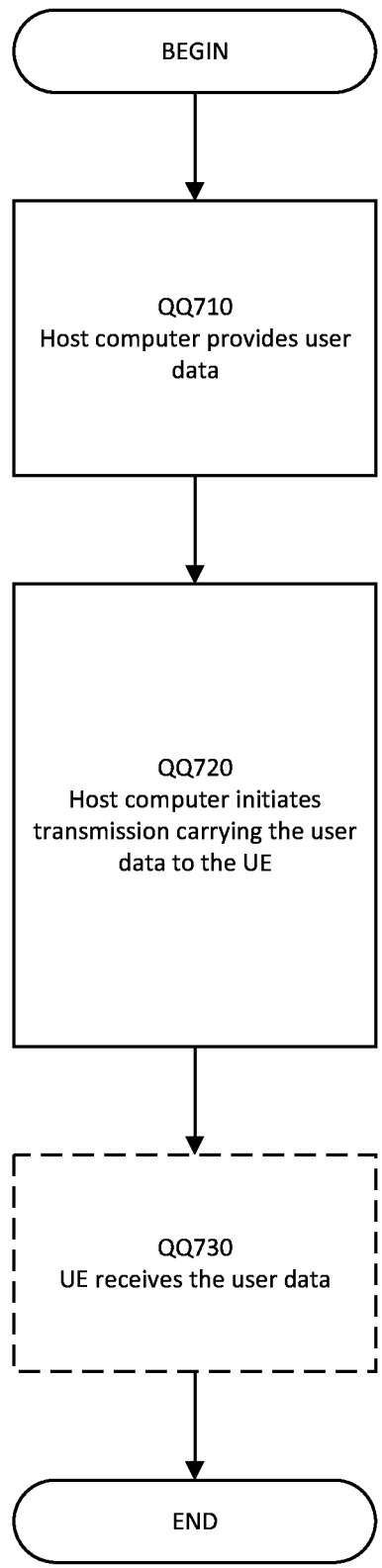
FIG. 14 is a flow chart illustrating methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 15:
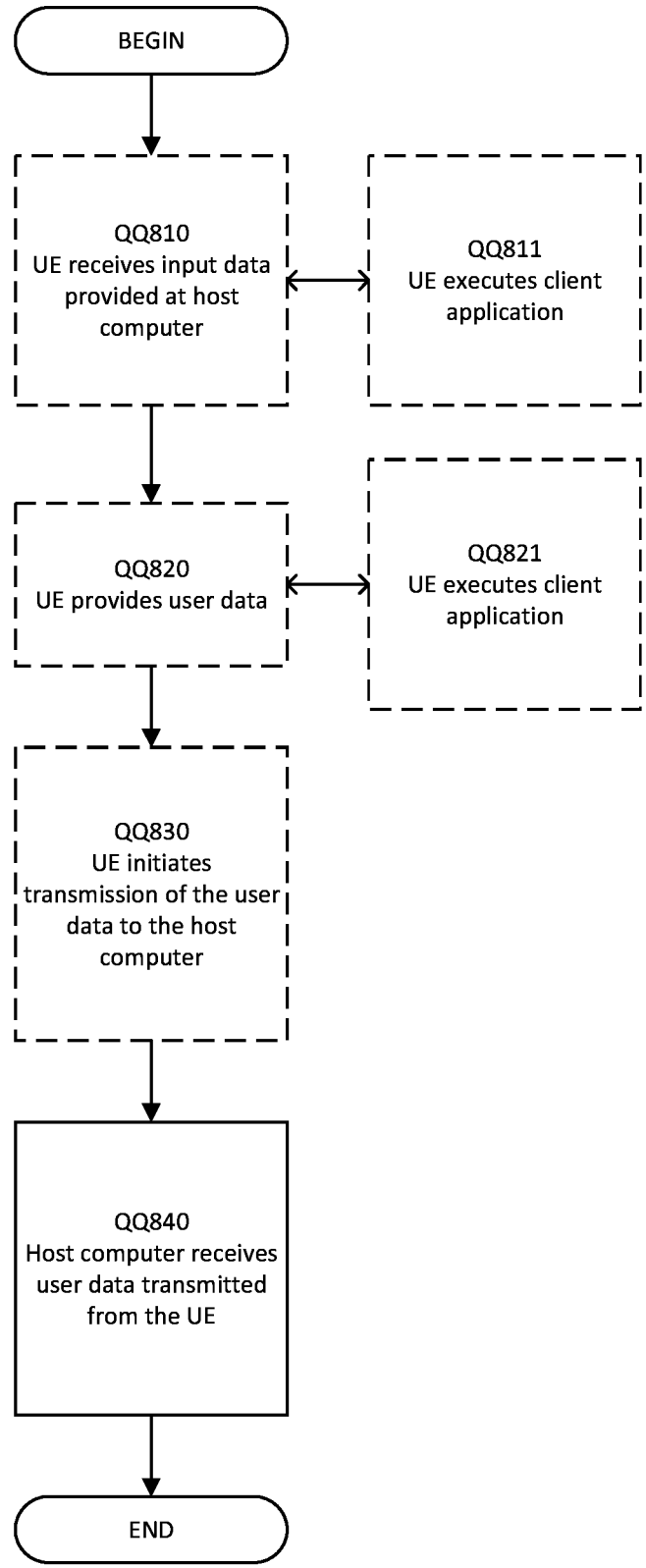
FIG. 15 is a flow chart illustrating methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 16:
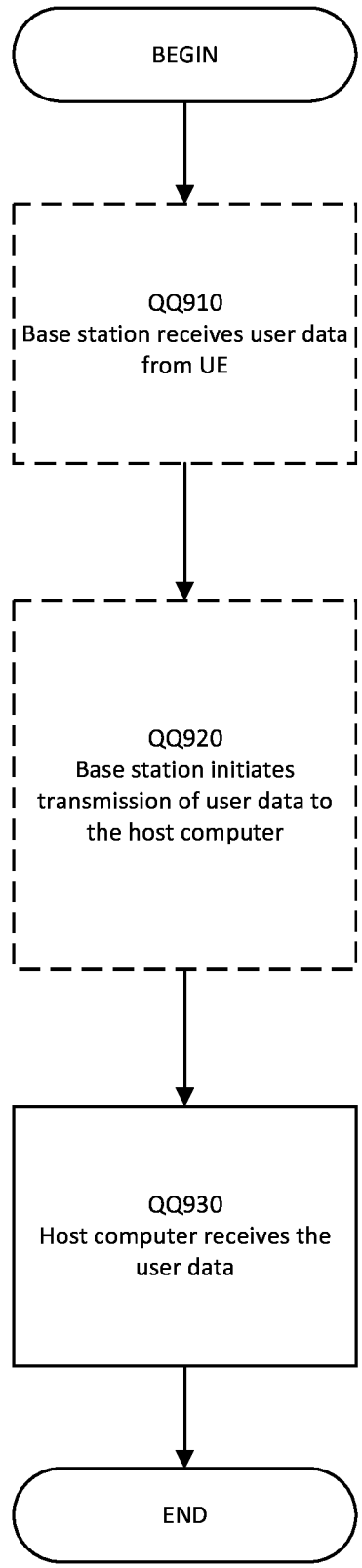
FIG. 16 is a flow chart illustrating methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Additional Example Embodiments are discussed below.

1. A method of operating a session management function, SMF, entity of a wireless communication network, the method comprising: receiving (851) an Ethernet context for a wireless terminal from a first user plane function, UPF, entity (257), wherein the Ethernet context is provided for an Ethernet Protocol Data Unit, PDU, Session for the wireless terminal using the first UPF entity, and wherein the Ethernet context includes a Medium Access Control, MAC, address for the wireless terminal; and transmitting (859) the Ethernet context including the MAC address for the wireless terminal to a second UPF entity (259).

2. The method of Embodiment 1, further comprising: selecting (857) the second UPF entity (259); wherein transmitting the Ethernet context comprises transmitting the ethernet context including the MAC address for the wireless terminal to the second UPF entity responsive to selecting the second UPF entity.

3. The method of Embodiment 2 further comprising: receiving (855) a request to switch the Ethernet PDU session for the wireless terminal; wherein selecting the second UPF entity (259) comprises selecting the second UPF entity responsive to receiving the request to switch the Ethernet PDU session for the wireless terminal.

4. The method of Embodiment 3, wherein the Ethernet context is provided for the Ethernet PDU Session for the wireless terminal using the first UPF entity (257) and using a first base station (253), wherein the request to switch the Ethernet PDU session for the wireless terminal includes an identification of a second base station (255) different than the first base station (253), and wherein selecting the second UPF entity (259) comprises selecting the second UPF entity based on the identification of the second base station (255).

5. The method of any of Embodiments 3-4, wherein receiving the request to switch the Ethernet PDU session comprises receiving the request from an Access and Mobility management Function, AMF, entity, the method further comprising: transmitting (863) an acknowledgement of the request to switch to the AMF entity after selecting the second UPF entity, wherein the acknowledgment includes an identification of the second UPF entity.

6. The method of any of Embodiments 1-5, wherein transmitting the Ethernet context comprises transmitting the Ethernet Context to the second UPF entity (259) in a session establishment request.

7. The method of any of Embodiments 2-6 further comprising: transmitting (865) a session release request for the wireless terminal to the first UPF entity (257) responsive to selecting the second UPF entity (259).

8. The method of any of Embodiments 1-7, wherein the Ethernet context includes a plurality of MAC addresses for the wireless terminal, and wherein transmitting the Ethernet context comprises transmitting the Ethernet context including the plurality of MAC addresses.

9. A method of operating a user plane function, UPF, entity (259) of a wireless communication network, the method comprising: receiving (951) a request to establish an Ethernet Protocol Data Unit, PDU, Session for a wireless terminal (251) using an Ethernet network, wherein the request to establish the Ethernet PDU Session includes a Medium Access Control, MAC, address for the wireless terminal; and updating (955) forwarding for the wireless terminal in the Ethernet network using the MAC address for the wireless terminal responsive to receiving the request.

10. The method of Embodiment 9, wherein receiving the request comprises receiving the request from a session management function, SMF, entity (263) of the wireless communication network.

11. The method of any of Embodiments 9-10, wherein the request includes an Ethernet context for the wireless terminal, and wherein the Ethernet context includes the MAC address for the wireless terminal.

12. The method of any of Embodiments 9-11, wherein updating forwarding for the wireless terminal comprises flooding the Ethernet network with a frame including the MAC address of the wireless terminal as a source of the frame.

13. The method of any of Embodiments 9-11, wherein updating forwarding for the wireless terminal comprises transmitting an instruction to a controller of the Ethernet network to forward downlink traffic for the wireless terminal through the UPF entity.

14. The method of any of Embodiments 9-13 further comprising: establishing (957) the Ethernet PDU session for the wireless terminal to support data communication between the wireless terminal and the Ethernet network through a base station (255) and the UPF entity responsive to the request; and providing (959) communication of data between the wireless terminal and the Ethernet network using the Ethernet PDU session through the base station (255) and the UPF entity.

15. The method of any of Embodiments 11-14, wherein the Ethernet context includes a plurality of MAC addresses for the wireless terminal, and wherein updating forwarding comprises updating forwarding in the Ethernet network using each of the plurality of MAC addresses.

16. A method of operating a user plane function, UPF, entity (257) of a wireless communication network, the method comprising: establishing (1051) an Ethernet PDU session for a wireless terminal to support data communication between the wireless terminal and an Ethernet network through a base station (253) and the UPF entity; transmitting (1055) an Ethernet context for the wireless terminal to a session management function, SMF, entity of the wireless communication network, wherein the Ethernet context includes a Medium Access Control, MAC, address for the wireless terminal; and releasing (1061) the Ethernet PDU session for the wireless terminal responsive to a session release request after transmitting the Ethernet context for the wireless terminal.

17. The method of Embodiment 16 further comprising: transmitting (1063) an end marker for the Ethernet PDU session for the wireless terminal responsive to the session release request.

18. The method of Embodiment 17, wherein the base station is a first base station (253), and wherein the end marker is transmitted to the first base station for retransmission to a second base station (255).

19. The method of any of Embodiments 16-18 further comprising: providing (1053) communication of data between the wireless terminal and the Ethernet network using the Ethernet PDU session through the base station (253) and the UPF entity (257) before releasing Ethernet PDU session.

20. The method of Embodiment 19, wherein providing communication comprises providing communication of data between the wireless terminal and the Ethernet network using the Ethernet PDU session through the base station and the UPF entity before and after receiving the session release request from the SMF entity.

21. A session management function, SMF, entity of a wireless communication network, wherein the SMF entity is adapted to perform operations according to any of Embodiments 1-8.

22. A user plane function, UPF, entity of a wireless communication network, wherein the UPF entity is adapted to perform operations according to any of Embodiments 9-20.

23. A session management function, SMF, entity of a wireless communication network, the SMF entity comprising: a processor (903); and memory (905) coupled with the processor, wherein the memory comprises instructions that when executed by the processor cause the processor to perform operations according to any of Embodiments 1-8.

24. A user plane function, UPF, entity of a wireless communication network, the UPF entity comprising: a processor (903); and memory (905) coupled with the processor, wherein the memory comprises instructions that when executed by the processor cause the processor to perform operations according to any of Embodiments 9-20.

Explanations of various abbreviations used herein are discussed below.

| Abbreviation | Explanation |
| --- | --- |
| AMF | Access and Mobility management Function |
| AS | Application Server |
| BS | Base Station |
| C-MTC | Critical Machine Type Communication |
| CN | Core Network |
| DC | Dual Connectivity |
| DNN | Data Network Name |
| DPI | Deep Packet Inspection |
| EPC | Evolved Packet Core |
| gNB | NR Node B |
| IP | Internet Protocol |
| LTE | Long Term Evolution |
| MAC | Medium Access Control |
| MgNB | Master gNB |
| NEF | Network Exposure Function |
| NRF | Network Resource Function |
| OTA | Over The Air |
| PCF | Policy Control Function |
| PDCP | Packet Data Convergence Protocol |
| PDU | Protocol Data Unit |
| PSA | PDU Session Anchor |
| RAN | Radio Access Network |
| SgNB | Secondary gNB |
| SMF | Session Management Function |
| SSC | Session and Service Continuity |
| SW | Switch |
| TSN | Time-Sensitive Networking |
| UDM | User Data Management |
| UE | User Equipment |
| UPF | User Plane Function |

Various references are mentioned above, and these references are identified below:

3GPP TS 23.501 V15.1.0 (2018-March), Technical Specification Group Services and System Aspects; System Architecture for the 5G System; Stage 2 (Release 15)

3GPP TS 23.502 V15.1.0 (2018-March), Technical Specification Group Services and System Aspects; Procedures for the 5G System; Stage 2 (Release 15)

3GPP TS 37.340 V15.1.0 (2018-March), Technical Specification Group Radio Access Network; Evolved Universal Terrestrial Radio Access (E-UTRA) and NR; Multi-connectivity; Stage 2 (Release 15)

International Application No. PCT/M2017/058517, filed Dec. 29, 2017, entitled "Methods Providing Dual Connectivity For Redundant User Plane Paths And Related Network Nodes"

3GPP TS 23.725 v2.0.0 (2018-December), Technical Specification Group Services and System Aspects; Study on enhancement of Ultra-Reliable Low-Latency Communication (URLLC) support in the 5G Core network (5GC) (Release 16)

Ericsson, "Anchor change for Ethernet PDU Sessions," 3GPP TSG-SA WG2 Meeting #128, S2-186420, Vilnius, Lithuania 2-6 Jul. 2018

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a session management function, SMF, entity of a wireless communication network, the method comprising:
receiving an Ethernet context for a wireless terminal from a first user plane function, UPF, entity, wherein the Ethernet context is provided for an Ethernet Protocol Data Unit, PDU, Session for the wireless terminal using the first UPF entity, and wherein the Ethernet context includes a Medium Access Control, MAC, address for the wireless terminal;

receiving a request to switch the Ethernet PDU session for the wireless terminal from an Access and Mobility management Function, AMF, entity;

transmitting an acknowledgement of the request to switch the Ethernet PDU session for the wireless terminal to the AMF entity, wherein the acknowledgment includes a no end marker flag indicating that there will be no end marker for the Ethernet PDU session; and transmitting the Ethernet context including the MAC address for the wireless terminal to a second UPF entity.

2. The method of claim 1, further comprising:

selecting the second UPF entity;

wherein transmitting the Ethernet context comprises transmitting the Ethernet context including the MAC address for the wireless terminal to the second UPF entity responsive to selecting the second UPF entity.

3. The method of claim 2 further comprising:

wherein selecting the second UPF entity comprises selecting the second UPF entity responsive to receiving the request to switch the Ethernet PDU session for the wireless terminal.

4. The method of claim 3, wherein the Ethernet context is provided for the Ethernet PDU Session for the wireless terminal using the first UPF entity and using a first base station, wherein the request to switch the Ethernet PDU session for the wireless terminal includes an identification of a second base station different than the first base station, and wherein selecting the second UPF entity comprises selecting the second UPF entity based on the identification of the second base station.

5. The method of claim 4 further comprising:

transmitting the acknowledgement of the request to switch to the AMF entity after selecting the second UPF entity, wherein the acknowledgment includes an identification of the second UPF entity.

6. The method of claim 1, wherein transmitting the Ethernet context comprises transmitting the Ethernet Context to the second UPF entity in a session establishment request.

7. The method of claim 2 further comprising:

transmitting a session release request for the wireless terminal to the first UPF entity responsive to selecting the second UPF entity.

8. The method of claim 1, wherein the Ethernet context includes a plurality of MAC addresses for the wireless terminal, and wherein transmitting the Ethernet context comprises transmitting the Ethernet context including the plurality of MAC addresses.

9. A method of operating a user plane function, UPF, entity of a wireless communication network, the method comprising:

receiving a request to establish an Ethernet Protocol Data Unit, PDU, Session for a wireless terminal using an Ethernet network, wherein the request to establish the Ethernet PDU Session includes a Medium Access Control, MAC, address for the wireless terminal;

updating forwarding for the wireless terminal in the Ethernet network using the MAC address for the wireless terminal responsive to receiving the request;

receiving a request to switch the Ethernet PDU session for the wireless terminal from an Access and Mobility management Function, AMF, entity; and transmitting an acknowledgement of the request to switch the Ethernet PDU session for the wireless terminal to the AMF entity, wherein the acknowledgement includes a no end marker flag indicating that there will be no end marker for the Ethernet PDU session.

10. The method of claim 9, wherein receiving the request comprises receiving the request from a session management function, SMF, entity of the wireless communication network.

11. The method of claim 9, wherein the request includes an Ethernet context for the wireless terminal, and wherein the Ethernet context includes the MAC address for the wireless terminal.

12. The method of claim 9, wherein updating forwarding for the wireless terminal comprises flooding the Ethernet network with a frame including the MAC address of the wireless terminal as a source of the frame.

13. The method of claim 9, wherein updating forwarding for the wireless terminal comprises transmitting an instruction to a controller of the Ethernet network to forward downlink traffic for the wireless terminal through the UPF entity.

14. The method of claim 9 further comprising:

establishing the Ethernet PDU session for the wireless terminal to support data communication between the wireless terminal and the Ethernet network through a base station and the UPF entity responsive to the request; and providing communication of data between the wireless terminal and the Ethernet network using the Ethernet PDU session through the base station and the UPF entity.

15. The method of claim 11, wherein the Ethernet context includes a plurality of MAC addresses for the wireless terminal, and wherein updating forwarding comprises updating forwarding in the Ethernet network using each of the plurality of MAC addresses.

16. A session management function, SMF, entity of a wireless communication network, the SMF entity comprising:

a processor; and memory coupled with the processor, wherein the memory comprises instructions that when executed by the processor cause the processor to:

receive an Ethernet context for a wireless terminal from a first user plane function, UPF, entity, wherein the Ethernet context is provided for an Ethernet Protocol Data Unit, PDU, Session for the wireless terminal using the first UPF entity, and wherein the Ethernet context includes a Medium Access Control, MAC, address for the wireless terminal;

receive a request to switch the Ethernet PDU session for the wireless terminal from an Access and Mobility management Function, AMF, entity;

transmit an acknowledgement of the request to switch the Ethernet PDU session for the wireless terminal to the AMF entity, wherein the acknowledgment includes a no end marker flag indicating that there will be no end marker for the Ethernet PDU session; and transmit the Ethernet context including the MAC address for the wireless terminal to a second UPF entity.

17. The SMF entity of claim 16, wherein the memory further comprises instructions that when executed by the processor cause the processor to:

select the second UPF entity;

wherein transmitting the Ethernet context comprises transmitting the Ethernet context including the MAC address for the wireless terminal to the second UPF entity responsive to selecting the second UPF entity.

18. A user plane function, UPF, entity of a wireless communication network, the UPF entity comprising:
- a processor; and
- memory coupled with the processor, wherein the memory comprises instructions that when executed by the processor cause the processor to:
  - receive a request to establish an Ethernet Protocol Data Unit, PDU, Session for a wireless terminal using an Ethernet network, wherein the request to establish the Ethernet PDU Session includes a Medium Access Control, MAC, address for the wireless terminal;
  - receive a request to switch the Ethernet PDU session for the wireless terminal from an Access and Mobility management Function, AMF, entity;
  - transmit an acknowledgement of the request to switch the Ethernet PDU session for the wireless terminal to the AMF entity, wherein the acknowledgment includes a no end marker flag indicating that there will be no end marker for the Ethernet PDU session; and
  - update forwarding for the wireless terminal in the Ethernet network using the MAC address for the wireless terminal responsive to receiving the request.

19. The UPF entity of claim 18, wherein receiving the request comprises receiving the request from a session management function, SMF, entity of the wireless communication network.

20. The method of claim 2, wherein the first UPF entity acts as a first PDU Session Anchor, PSA, for the Ethernet PDU Session for the wireless terminal using the Ethernet context including the MAC address for the wireless terminal, wherein selecting the second UPF entity comprises selecting the second UPF entity to act as a second PSA for the Ethernet PDU Session for the wireless terminal using the Ethernet context including the MAC address for the wireless terminal, and wherein transmitting the ethernet context comprises transmitting the ethernet context including the MAC address for the wireless terminal to the second UPF to change from the first PSA of the PDU Session to the second PSA of the PDU Session using the Ethernet context without releasing the PDU Session.

21. The SMF entity of claim 17, wherein the first UPF entity acts as a first PDU Session Anchor, PSA, for the Ethernet PDU Session for the wireless terminal using the Ethernet context including the MAC address for the wireless terminal, wherein selecting the second UPF entity comprises selecting the second UPF entity to act as a second PSA for the Ethernet PDU Session for the wireless terminal using the Ethernet context including the MAC address for the wireless terminal, and wherein transmitting the ethernet context comprises transmitting the ethernet context including the MAC address for the wireless terminal to the second UPF to change from the first PSA of the PDU Session to the second PSA of the PDU Session using the Ethernet context without releasing the PDU Session.

* * * * *

UNITED STATES PATENT AND TRADEMARK OFFICE
CERTIFICATE OF CORRECTION

| | | |
|---|---|---|
| PATENT NO. | : 11,375,415 B2 | Page 1 of 1 |
| APPLICATION NO. | : 16/476386 | |
| DATED | : June 28, 2022 | |
| INVENTOR(S) | : György Miklós | |

It is certified that error appears in the above-identified patent and that said Letters Patent is hereby corrected as shown below:

In the Specification

In Column 6, Line 47, delete "a According" and insert -- According --, therefor.

In Column 14, Line 1, delete "(at 4000." and insert -- (at 400f). --, therefor.

Signed and Sealed this
Fourth Day of July, 2023

Katherine Kelly Vidal
*Director of the United States Patent and Trademark Office*